United States Patent
Tsuzumi et al.

(10) Patent No.: US 10,858,717 B2
(45) Date of Patent: *Dec. 8, 2020

(54) MATERIAL FOR HIGH STRENGTH STEEL SHEETS, HOT ROLLED MATERIAL FOR HIGH STRENGTH STEEL SHEETS, HOT-ROLLED AND ANNEALED MATERIAL FOR HIGH STRENGTH STEEL SHEETS, HIGH STRENGTH STEEL SHEET, HIGH STRENGTH HOT-DIP-COATED STEEL SHEET, HIGH STRENGTH ELECTROPLATED STEEL SHEET, AND METHOD OF MANUFACTURING SAME

(71) Applicant: JFE STEEL CORPORATION, Tokyo (JP)

(72) Inventors: Kenji Tsuzumi, Tokyo (JP); Yoshiyasu Kawasaki, Tokyo (JP); Yuji Miki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 277 days.

This patent is subject to a terminal disclaimer.

(21) Appl. No.: 15/735,678

(22) PCT Filed: Aug. 10, 2016

(86) PCT No.: PCT/JP2016/003702
§ 371 (c)(1),
(2) Date: Dec. 12, 2017

(87) PCT Pub. No.: WO2017/026125
PCT Pub. Date: Feb. 16, 2017

(65) Prior Publication Data
US 2018/0363088 A1 Dec. 20, 2018

(30) Foreign Application Priority Data
Aug. 11, 2015 (JP) .................................. 2015-159068

(51) Int. Cl.
| | |
|---|---|
| C21D 9/46 | (2006.01) |
| B22D 11/124 | (2006.01) |
| C23C 2/12 | (2006.01) |
| C23C 2/28 | (2006.01) |
| C23C 2/40 | (2006.01) |
| C23C 28/02 | (2006.01) |

(Continued)

(52) U.S. Cl.
CPC ............... *C21D 9/46* (2013.01); *B22D 11/00* (2013.01); *B22D 11/001* (2013.01); *B22D 11/124* (2013.01); *B22D 11/22* (2013.01); *B32B 15/012* (2013.01); *C21D 6/004* (2013.01); *C21D 6/005* (2013.01); *C21D 6/008* (2013.01); *C21D 8/021* (2013.01); *C21D 8/0205* (2013.01); *C21D 8/0226* (2013.01); *C21D 8/0247* (2013.01); *C21D 8/041* (2013.01); *C21D 8/0426* (2013.01); *C21D 8/0436* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/06* (2013.01); *C22C 38/14* (2013.01); *C22C 38/20* (2013.01); *C22C 38/22* (2013.01); *C22C 38/24* (2013.01); *C22C 38/26* (2013.01); *C22C 38/32* (2013.01); *C22C 38/50* (2013.01); *C22C 38/58* (2013.01); *C22C 38/60* (2013.01); *C23C 2/06* (2013.01); *C23C 2/12* (2013.01); *C23C 2/28* (2013.01); *C23C 2/40* (2013.01); *C23C 28/02* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | |
|---|---|---|
| 9,580,779 B2 | 2/2017 | Kawasaki et al. |
| 9,758,848 B2 | 9/2017 | Kawasaki et al. |

(Continued)

FOREIGN PATENT DOCUMENTS

| | | |
|---|---|---|
| CN | 101065503 A | 10/2007 |
| CN | 103502496 A | 1/2014 |

(Continued)

OTHER PUBLICATIONS

Nov. 15, 2016, International Search Report issued in the International Patent Application No. PCT/JP2016/003702.

(Continued)

*Primary Examiner* — Jenny R Wu
(74) *Attorney, Agent, or Firm* — Kenja IP Law PC

(57) ABSTRACT

A high strength steel sheet having excellent surface quality and formability with a tensile strength of 980 MPa or more and a TS-El balance of 30000 MPa % or more is provided. A high strength steel sheet comprises: a chemical composition containing C: 0.08% to 0.30%, Si: 2.0% or less, Mn: more than 3.0% and 10.0% or less, P: 0.05% or less, S: 0.01% or less, Al: 1.5% or less, Ti: 0.010% to 0.300%, and N: 0.0020% to 0.0100% in a range satisfying $1.1 \leq (Ti+Mn^{1/2}/400)/(0.01+5N) \leq 6.0$; and a microstructure including a retained austenite phase and a ferrite phase, wherein a ratio $\gamma Mn/\alpha Mn$ of an average Mn concentration ($\gamma Mn$) of the retained austenite phase to an average Mn concentration ($\alpha Mn$) of the ferrite phase is 1.5 or more.

14 Claims, No Drawings

(51) Int. Cl.

| | |
|---|---|
| *B22D 11/00* | (2006.01) |
| *C21D 6/00* | (2006.01) |
| *C21D 8/02* | (2006.01) |
| *C23C 2/06* | (2006.01) |
| *C22C 38/00* | (2006.01) |
| *C22C 38/14* | (2006.01) |
| *C22C 38/60* | (2006.01) |
| *C21D 8/04* | (2006.01) |
| *B22D 11/22* | (2006.01) |
| *B32B 15/01* | (2006.01) |
| *C22C 38/02* | (2006.01) |
| *C22C 38/06* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/32* | (2006.01) |
| *C22C 38/50* | (2006.01) |
| *C22C 38/58* | (2006.01) |

(56) References Cited

U.S. PATENT DOCUMENTS

| | | | |
|---|---|---|---|
| 10,550,446 B2 * | 2/2020 | Kawasaki | C21D 6/001 |
| 2005/0081966 A1 | 4/2005 | Kashima et al. | |
| 2009/0010793 A1 | 1/2009 | Becker et al. | |
| 2010/0084057 A1 * | 4/2010 | Furuhashi | C22C 38/04 |
| | | | 148/603 |
| 2011/0139315 A1 | 6/2011 | Nakagaito et al. | |
| 2013/0032253 A1 | 2/2013 | Kariya et al. | |
| 2014/0050941 A1 | 2/2014 | Kawasaki et al. | |
| 2014/0230971 A1 | 8/2014 | Kawasaki et al. | |
| 2014/0242416 A1 | 8/2014 | Matsuda et al. | |
| 2014/0332123 A1 | 11/2014 | Nakagawa et al. | |
| 2016/0222485 A1 | 8/2016 | Murakami et al. | |

FOREIGN PATENT DOCUMENTS

| | | | | |
|---|---|---|---|---|
| CN | 103797145 A | 5/2014 | | |
| CN | 104011240 A | 8/2014 | | |
| EP | 2757169 A1 * | 7/2014 | ........ | C21D 8/0236 |
| JP | H11236621 A | 8/1999 | | |
| JP | 2001335908 A | 12/2001 | | |
| JP | 2002307148 A | 10/2002 | | |
| JP | 3596316 B2 | 12/2004 | | |
| JP | 3622687 B2 | 2/2005 | | |
| JP | 2008519160 A | 6/2008 | | |
| JP | 2008291282 A | 12/2008 | | |
| JP | 4374196 B2 | 12/2009 | | |
| JP | 2011218403 A | 11/2011 | | |
| JP | 2013076162 A | 4/2013 | | |
| JP | 5440672 B2 | 3/2014 | | |
| WO | 2012147898 A1 | 11/2012 | | |

OTHER PUBLICATIONS

May 31, 2019, Office Action issued by the China National Intellectual Property Administration in the corresponding Chinese Patent Application No. 201680046400.3 with English language search report.

May 15, 2020, Office Action issued by the United States Patent and Trademark Office in the U.S. Appl. No. 15/520,236.

Sep. 10, 2020, Office Action issued by the United States Patent and Trademark Office in U.S. Appl. No. 15/520,236.

\* cited by examiner

MATERIAL FOR HIGH STRENGTH STEEL SHEETS, HOT ROLLED MATERIAL FOR HIGH STRENGTH STEEL SHEETS, HOT-ROLLED AND ANNEALED MATERIAL FOR HIGH STRENGTH STEEL SHEETS, HIGH STRENGTH STEEL SHEET, HIGH STRENGTH HOT-DIP-COATED STEEL SHEET, HIGH STRENGTH ELECTROPLATED STEEL SHEET, AND METHOD OF MANUFACTURING SAME

TECHNICAL FIELD

The disclosure relates to a high strength steel sheet excellent in surface quality and strength-ductility balance and for use in vehicle steel sheets or structural materials, construction machines, pipes, and the like required to have both high strength and high formability, an intermediate product suitable for manufacturing the high strength steel sheet, and a method of manufacturing the same.

BACKGROUND

Steel used in the fields such as vehicle steel sheets or structural materials, construction machines, and pipes needs to have high strength, in order to maintain the functions of the steel product against an external impact or load and protect humans or objects inside the structure made of the steel. In particular, while lighter steel sheets are demanded for reduction of environmental load and cost in recent years, durability needs to be maintained even when steel sheets are made thinner. The demand for strengthening is thus growing.

However, strengthening the steel typically causes a decrease in formability. This raises the need to maintain high formability. An index for achieving both strength and formability is TS-El balance which is expressed by the product TS×El of tensile strength (TS) and elongation (El) in a tensile test, and it is important that the steel has high TS-El balance.

As a material fit for such use, TRIP steel has been proposed. TRIP steel has a microstructure partly or wholly consisting of metastable austenite, and utilizes a transformation induced plasticity (TRIP) effect of causing strain-induced martensite transformation of the metastable austenite to improve uniform elongation.

For example, JP 2001-335908 A (PTL 1) discloses the following steel called TRIP steel (or TRIP aided steel). Steel to which Al, Si, and Mn are added is held in a bainite transformation temperature range in a cooling process after annealing so that C concentrates in austenite in ferrite matrix phase, thus forming a small amount of austenite (retained austenite) that is metastable even at ambient temperature. Such steel has relatively high formability with a TS-El balance of more than 20000 MPa %, even when TS is in a range of 590 MPa to 980 MPa. For further strengthening with a TS of more than 980 MPa, however, elongation improvement is not enough, and it is difficult to ensure sufficient formability.

In view of this, TWIP steel has been proposed. TWIP steel utilizes a twin induced plasticity effect of causing strain-induced twin transformation by adding more than 10% Mn which is an austenite-stabilizing element to stabilize austenite even at ambient temperature, thus improving ductility. For example, JP 2008-519160 A (PTL 2) discloses steel that has excellent formability with a TS-El balance of 40000 MPa % or more where TS is 700 MPa or more and El is 40% to 60%. However, such steel requires high alloy cost. Besides, hot ductility in the slab stage is low, and the slab surface layer cracks upon bending straightening by a continuous casting machine or hot rolling, which degrades the surface quality of the finished product. Accordingly, slab mending is essential. Furthermore, since a special casting line is necessary, the manufacturing cost increases significantly.

JP 5440672 B2 (PTL 3) proposes TRIP steel having a TS-El balance of more than 30000 MPa % with a TS of 980 MPa to 1180 MPa and an El of 30% to 25%, by distributing Mn to austenite to stabilize austenite while limiting the Mn content to about 5% to 10% to improve manufacturability. However, even such steel has a serious problem of slab cracking in a bending straightening part in casting, and cannot resolve a cost increase caused by slab mending and a yield rate decrease caused by degraded surface quality of the finished product.

JP 3596316 B2 (PTL 4) discloses a high strength steel sheet manufacturing method that reduces slab cracking by appropriately adjusting Ti and N contents in a steel composition. However, this method is intended for steel with relatively low strength containing 3.0% or less Mn, and is not appropriate for manufacturing a high strength steel sheet containing more than 3.0% Mn.

JP 3622687 B2 (PTL 5) discloses a technique of refining microstructure in a slab through the use of phase transformation during heat recuperation after quenching the steel to $Ar_3$ temperature or less before reaching a bending part, to suppress cracking. However, in high alloy steel containing more than 3.0% Mn, transformation is considerably delayed or decreased in temperature, so that very slow casting or such excessively strong cooling that can cause slab cracking is needed to induce phase transformation before reaching a bending straightening part of a continuous casting machine. Thus, this technique is not always effective.

JP 2011-218403 A (PTL 6) describes a means for maintaining higher temperature than an embrittlement temperature range by mild cooling. With this technique, however, the solidified shell thickness decreases due to mild cooling, and a bulging phenomenon in which the shell bulges outward by the pressure of the molten steel increases. This results in degradation in surface quality due to longitudinal cracking or cracking under the surface layer, and degradation in material quality such as ductility and stretch flangeability due to internal cracking or a local hard portion created by worsening central segregation. Besides, since the steel is subjected to strain while being held at high temperature for a long time, the elements added for strengthening the finished product by precipitation, such as Ti, Nb, and V, coarsen significantly in the slab, and do not dissolve sufficiently in a heating furnace in the subsequent hot rolling. This reduces strengthening by precipitation. Furthermore, the casting rate (Vc) needs to be lowered to achieve complete solidification in a continuous casting machine. This causes a decrease in manufacturing efficiency.

CITATION LIST

Patent Literatures

PTL 1: JP 2001-335908 A
PTL 2: JP 2008-519160 A
PTL 3: JP 5440672 B2
PTL 4: JP 3596316 B2
PTL 5: JP 3622687 B2
PTL 6: JP 2011-218403 A

SUMMARY

Technical Problem

It could therefore be helpful to provide a high strength steel sheet having excellent surface quality and formability with a tensile strength of 980 MPa or more and a TS-El balance of 30000 MPa % or more, an intermediate product suitable for manufacturing the high strength steel sheet, and a manufacturing method that can improve slab surface quality and interior quality such as segregation in casting.

Solution to Problem

Regarding steel having a chemical composition containing more than 3.0 mass % Mn, we conducted extensive study on how to manufacture steel having both high strength and high ductility while suppressing slab cracking or rolling cracking due to high-temperature embrittlement, and discovered the following.

High-temperature embrittlement of high Mn steel is caused by a combination of: the concentration of deformation strain in grain boundaries associated with coarsening of austenite crystal grains in a cooling process after casting; and grain boundary embrittlement resulting from the formation of fine precipitates such as AlN, Nb(CN), and MnS in grain boundaries. An effective way of suppressing this is to appropriately control the Ti, N, and Mn contents.

Ti forms fine Ti-based carbonitride and sulfide in a microstructure and significantly inhibits the grain growth of austenite, and also suppresses the formation of precipitates embrittling austenite grain boundaries, such as AlN, Nb(CN), and fine MnS. A conventional technique adds Ti that is stoichiometrically equivalent to N content in order to fix N. This amount is, however, not sufficient for steel containing more than 3.0 mass % Mn, and more Ti needs to be added. Although the reason for this is not clear, it is considered that a large amount of Ti forms TiN from a high temperature range to effectively inhibit γ grain growth in the high temperature range, and also forms Ti carbide or a cluster with C to effectively inhibit austenite grain growth and improve hot ductility.

Although the reason for the effectiveness of Mn is not clear, either, it is considered that adding a large amount of Mn induces a decrease in solidification temperature, early formation of MnS, a solute-drag effect for austenite grain boundaries, and the like, thus inhibiting austenite grain growth.

This steel is kept from cracking due to embrittlement even when the temperature of the slab passing through the straightening zone in the continuous casting machine decreases, so that a slab excellent in surface quality is yielded. Moreover, the solidified shell thickness increases to suppress bulging, and as a result a decrease in surface quality caused by longitudinal cracking or cracking under the surface layer can be reduced. Furthermore, internal cracking and central segregation can be reduced to effectively improve formability.

An effective way of obtaining steel having high strength and high ductility is to perform soaking on steel containing more than 3.0% Mn in a batch annealing furnace (BAF) after hot rolling. Hence, from tempered ferrite, bainite, or martensite, Mn concentrates in retained austenite 1.5 times or more on average, which contributes to excellent ductility after cold rolling and annealing.

The addition of Ti also has an additional effect of improving the strength of the finished product without decreasing ductility. In particular, ensuring the strength by adding Ti instead of Mn greatly contributes to improved weldability and wettability, and improved workability such as stretch flangeability and deep drawability other than ductility. It is assumed that Ti carbonitride precipitated in the steel as mentioned above inhibits microstructure recrystallization and grain growth during reheating of the steel sheet, thus refining the microstructure. The effect of substitution of Ti and Mn is formulated from such perspective. Both hot ductility improvement and strengthening are achieved if the value of the expression $(Ti+Mn^{1/2}/400)/(0.01+5N)$ is in a predetermined numerical range.

The disclosure is based on the aforementioned discoveries. We thus provide:

1. A material for high strength steel sheets, comprising a chemical composition containing (consisting of), in mass %, C: 0.08% or more and 0.30% or less,
Si: 2.0% or less,
Mn: more than 3.0% and 10.0% or less,
P: 0.05% or less,
S: 0.01% or less,
Al: 1.5% or less,
Ti: 0.010% or more and 0.300% or less, and
N: 0.0020% or more and 0.0100% or less in a range satisfying the following Expression (1), with a balance being Fe and incidental impurities, $$1.1 \leq ([Ti]+[Mn]^{1/2}/400)/(0.01+5[N]) \leq 6.0 \quad (1)$$

where [Ti], [Mn], and [N] respectively denote contents of elements Ti, Mn, and N in mass %, wherein ΔMn according to the following Expression (2) is 0.45% or more, $$\Delta Mn = \Sigma(Mn_{max,i} - Mn_{min,i})/i \quad (2)$$

where $Mn_{max,i}$ and $Mn_{min,i}$ are respectively a maximum concentration of a positive segregation area of Mn and a minimum concentration of a negative segregation area of Mn at adjacent measurement points in EPMA linear analysis with a beam diameter of 1 μm for any 10 mm interval in a transverse direction at a depth position of ¼ of a thickness t from a surface of the material, and ΔMn is an average value of concentration differences of a total of i positive and negative segregation pairs in 10 mm intervals.

2. The material for high strength steel sheets according to 1., wherein the chemical composition further contains, in mass %, one or more selected from the group consisting of:

Cr: 1.0% or less,
Ni: 1.0% or less,
Mo: 1.0% or less,
Cu: 1.0% or less,
Nb: 0.1% or less,
V: 0.1% or less,
B: 0.0050% or less,
Ca: 1.0% or less,
REM: 1.0% or less,
Sn: 0.20% or less, and
Sb: 0.2% or less.

3. A method of manufacturing a material for high strength steel sheets, comprising continuous casting molten steel having the chemical composition according to 1. or 2. to obtain a slab, the continuous casting including performing cooling with a specific water content S of 0.5 L/kg steel or more and 2.5 L/kg steel or less until a solidified shell surface layer portion temperature in a secondary cooling zone reaches 900° C., passing the steel through a bending part and a straightening part at a temperature of 600° C. or more and 1150° C. or less, and then performing cooling with an average cooling rate from 400° C. to 200° C. being 1.0° C./s or less.

4. A hot rolled material for high strength steel sheets, comprising a chemical composition containing, in mass %,
C: 0.08% or more and 0.30% or less,
Si: 2.0% or less,
Mn: more than 3.0% and 10.0% or less,
P: 0.05% or less,
S: 0.01% or less,
Al: 1.5% or less,
Ti: 0.010% or more and 0.300% or less, and
N: 0.0020% or more and 0.0100% or less
in a range satisfying the following Expression (1), with a balance being Fe and incidental impurities, $$1.1 \leq ([Ti]+[Mn]^{1/2}/400)/(0.01+5[N]) \leq 6.0 \tag{1}$$

where [Ti], [Mn], and [N] respectively denote contents of elements Ti, Mn, and N in mass %,
wherein $\Delta Mn$ according to the following Expression (2) is 0.50% or more, $$\Delta Mn = \Sigma(Mn_{max,i} - Mn_{min,i})/i \tag{2}$$

where $Mn_{max,i}$ and $Mn_{min,i}$ are respectively a maximum concentration of a positive segregation area of Mn and a minimum concentration of a negative segregation area of Mn at adjacent measurement points in EPMA linear analysis with a beam diameter of 1 μm for any 10 mm interval in a sheet transverse direction at a depth position of ¼ of a sheet thickness t from a surface of the hot rolled material, and $\Delta Mn$ is an average value of concentration differences of a total of i positive and negative segregation pairs in 10 mm intervals.

5. The hot rolled material for high strength steel sheets according to 4., wherein the chemical composition further contains, in mass %, one or more selected from the group consisting of:
Cr: 1.0% or less,
Ni: 1.0% or less,
Mo: 1.0% or less,
Cu: 1.0% or less,
Nb: 0.1% or less,
V: 0.1% or less,
B: 0.0050% or less,
Ca: 1.0% or less,
REM: 1.0% or less,
Sn: 0.20% or less, and
Sb: 0.2% or less.

6. A method of manufacturing a hot rolled material for high strength steel sheets, comprising: continuous casting molten steel having the chemical composition according to 4. or 5. to obtain a slab, the continuous casting including performing cooling with a specific water content S of 0.5 L/kg steel or more and 2.5 L/kg steel or less until a solidified shell surface layer portion temperature in a secondary cooling zone reaches 900° C., passing the steel through a bending part and a straightening part at a temperature of 600° C. or more and 1150° C. or less, and then performing cooling with an average cooling rate from 400° C. to 200° C. being 1.0° C./s or less; hot rolling the obtained slab at a finisher delivery temperature of an $Ar_3$ point or more; and thereafter performing coiling in a temperature range of [an Ms point+50° C.] or more and 700° C. or less, and performing cooling to 200° C. or less.

7. A hot-rolled and annealed material for high strength steel sheets, comprising: a chemical composition containing, in mass %,
C: 0.08% or more and 0.30% or less,
Si: 2.0% or less,
Mn: more than 3.0% and 10.0% or less,
P: 0.05% or less,
S: 0.01% or less,
Al: 1.5% or less,
Ti: 0.010% or more and 0.300% or less, and
N: 0.0020% or more and 0.0100% or less
in a range satisfying the following Expression (1), with a balance being Fe and incidental impurities, $$1.1 \leq ([Ti]+[Mn]^{1/2}/400)/(0.01+5[N]) \leq 6.0 \tag{1}$$

where [Ti], [Mn], and [N] respectively denote contents of elements Ti, Mn, and N in mass %; and
a microstructure including a retained austenite phase and a ferrite phase,
wherein a ratio $\gamma Mn/\alpha Mn$ of an average Mn concentration $\gamma Mn$ of the retained austenite phase to an average Mn concentration $\alpha Mn$ of the ferrite phase is 1.5 or more.

8. The hot-rolled and annealed material for high strength steel sheets according to 7., wherein the chemical composition further contains, in mass %, one or more selected from the group consisting of:
Cr: 1.0% or less,
Ni: 1.0% or less,
Mo: 1.0% or less,
Cu: 1.0% or less,
Nb: 0.1% or less,
V: 0.1% or less,
B: 0.0050% or less,
Ca: 1.0% or less,
REM: 1.0% or less,
Sn: 0.20% or less, and
Sb: 0.2% or less.

9. A method of manufacturing a hot-rolled and annealed material for high strength steel sheets, comprising: continuous casting molten steel having the chemical composition according to 7. or 8. to obtain a slab, the continuous casting including performing cooling with a specific water content S of 0.5 L/kg steel or more and 2.5 L/kg steel or less until a solidified shell surface layer portion temperature in the continuous casting reaches 900° C., passing the steel through a bending part and a straightening part at a temperature of 600° C. or more and 1150° C. or less, and then performing cooling with an average cooling rate from 400° C. to 200° C. being 1.0° C./s or less; hot rolling the obtained slab at a finisher delivery temperature of an $Ar_3$ point or more; thereafter performing coiling in a temperature range of [an Ms point+50° C.] or more and 700° C. or less, and performing cooling to 200° C. or less, to obtain a steel strip; further holding the obtained steel strip in a temperature range of [an $Ac_1$ transformation point−200° C.] or more and [the $Ac_1$ transformation point+100° C.] or less, for 30 min or more; and thereafter cooling the steel strip to 200° C. or less.

10. A high strength steel sheet comprising: a chemical composition containing, in mass %,
C: 0.08% or more and 0.30% or less,
Si: 2.0% or less,
Mn: more than 3.0% and 10.0% or less,
P: 0.05% or less,
S: 0.01% or less,
Al: 1.5% or less,
Ti: 0.010% or more and 0.300% or less, and
N: 0.0020% or more and 0.0100% or less in a range satisfying the following Expression (1), with a balance being Fe and incidental impurities, $$1.1 \leq ([Ti]+[Mn]^{1/2}/400)/(0.01+5[N]) \leq 6.0 \qquad (1)$$

where [Ti], [Mn], and [N] respectively denote contents of elements Ti, Mn, and N in mass %; and a microstructure including a retained austenite phase and a ferrite phase, wherein a ratio γMn/αMn of an average Mn concentration γMn of the retained austenite phase to an average Mn concentration αMn of the ferrite phase is 1.5 or more.

11. The high strength steel sheet according to 10., wherein the chemical composition further contains, in mass %, one or more selected from the group consisting of:

Cr: 1.0% or less,
Ni: 1.0% or less,
Mo: 1.0% or less,
Cu: 1.0% or less,
Nb: 0.1% or less,
V: 0.1% or less,
B: 0.0050% or less,
Ca: 1.0% or less,
REM: 1.0% or less,
Sn: 0.20% or less, and
Sb: 0.2% or less.

12. A method of manufacturing a high strength steel sheet, comprising: continuous casting molten steel having the chemical composition according to 10. or 11. to obtain a slab, the continuous casting including performing cooling with a specific water content S of 0.5 L/kg steel or more and 2.5 L/kg steel or less until a solidified shell surface layer portion temperature in a secondary cooling zone reaches 900° C., passing the steel through a bending part and a straightening part at a temperature of 600° C. or more and 1150° C. or less, and then performing cooling with an average cooling rate from 400° C. to 200° C. being 1.0° C./s or less; hot rolling the obtained slab at a finisher delivery temperature of an $Ar_3$ point or more, to obtain a hot rolled steel sheet; thereafter coiling the hot rolled steel sheet in a temperature range of [an Ms point+50° C.] or more and 700° C. or less, and cooling the hot rolled steel sheet to 200° C. or less; thereafter cold rolling or warm rolling the hot rolled steel sheet at a rolling reduction of 15% or more; and thereafter holding the steel sheet in a temperature range of an $Ac_1$ transformation point or more and [the $Ac_1$ transformation point+(the $Ac_3$ transformation point−the $Ac_1$ transformation point)/2] or less, for 30 sec or more and 400 min or less.

13. A method of manufacturing a high strength steel sheet, comprising: continuous casting molten steel having the chemical composition according to 10. or 11. to obtain a slab, the continuous casting including performing cooling with a specific water content S of 0.5 L/kg steel or more and 2.5 L/kg steel or less until a solidified shell surface layer portion temperature in a secondary cooling zone reaches 900° C., passing the steel through a bending part and a straightening part at a temperature of 600° C. or more and 1150° C. or less, and then performing cooling with an average cooling rate from 400° C. to 200° C. being 1.0° C./s or less; hot rolling the obtained slab at a finisher delivery temperature of an $Ar_3$ point or more, to obtain a hot rolled steel sheet; thereafter coiling the hot rolled steel sheet in a temperature range of [an Ms point+50° C.] or more and 700° C. or less, and cooling the hot rolled steel sheet to 200° C. or less, to obtain a steel strip; further holding the obtained steel strip in a temperature range of [an $Ac_1$ transformation point−200° C.] or more and [the $Ac_1$ transformation point+100° C.] or less, for 30 min or more; thereafter cooling the steel strip to 200° C. or less; thereafter cold rolling or warm rolling the steel strip at a rolling reduction of 15% or more; and thereafter holding the steel strip in a temperature range of the $Ac_1$ transformation point or more and [the $Ac_1$ transformation point+(the $Ac_3$ transformation point−the $Ac_1$ transformation point)/2] or less, for 30 sec or more and 400 min or less.

14. A high strength hot-dip-coated steel sheet comprising: the high strength steel sheet according to 10. or 11.; and a hot-dip galvanized coating or a hot-dip aluminum coating on a surface of the high strength steel sheet.

15. A high strength electroplated steel sheet comprising: the high strength hot-dip-coated steel sheet according to 14.; and an electroplating on a surface of the high strength hot-dip-coated steel sheet.

Advantageous Effect

It is possible to provide a high strength steel sheet having excellent workability with a tensile strength (TS) of 980 MPa or more and a TS-El balance of 30000 MPa % or more, and having excellent surface quality. It is also possible to provide an intermediate product suitable for reliably yielding such a high strength steel sheet. For example, by using the high strength steel sheet for vehicle structural parts, the strength and stiffness of the vehicle are improved through the formation of parts of complex shapes, which contributes to enhanced safety of the driver and passengers. In addition, fuel efficiency is improved by reducing the vehicle weight. Moreover, a considerable increase in production yield rate enables reduction in $CO_2$ emission. This leads to overall reduction of global environmental load.

DETAILED DESCRIPTION

A material for high strength steel sheets, a hot rolled material for high strength steel sheets, a hot-rolled and annealed material for high strength steel sheets, a high strength steel sheet, a high strength hot-dip galvanized steel sheet, and a high strength electroplated steel sheet according to the disclosure are described in detail below. The chemical composition of steel is the same from a material to a finished product such as a high strength steel sheet or a high strength coated or plated steel sheet. The following describes the reasons for the limitation of each element in the chemical composition. In the description of the chemical composition, "%" denotes "mass %" unless otherwise noted.

[Chemical Composition]

C: 0.08% or more and 0.30% or less

C not only increases the volume fraction of austenite to enhance strength but also increases the stability of austenite to enhance ductility, and so is an important element contributing to improved TS-El balance. If the C content is less than 0.08%, this effect is insufficient, and sufficient strength cannot be obtained. The lower limit of the C content is therefore 0.08%. If the C content is more than 0.30%, hard phase increases excessively, causing a decrease in ductility, bendability, hole expansion formability, or hydrogen embrittlement resistance. The upper limit of the C content is therefore 0.30%.

Si: 2.0% or less

Si increases the amount of solute C in austenite, and thus contributes to improved stability of austenite. Si also expands the dual-phase temperature range during annealing, to reduce variation in secondary phase volume fraction during annealing and stabilize material property. Si further facilitates internal oxidation in the annealing process, and reduces surface concentration of Mn, thus contributing to improved wettability. To achieve these effects, the Si content is preferably 0.1% or more. Meanwhile, excessively adding Si causes the formation of firm scale during heating. This leads to surface cracking and scale flaw, and degrades surface quality. Besides, oxides form on the steel sheet surface during annealing, too, and impair coatability and chemical convertibility. To prevent this, the upper limit of the Si content is 2.0%. The Si content is more preferably 1.0% or less. In terms of ensuring better surface quality, the Si content is preferably 0.5% or less.

Mn: more than 3.0% and 10.0% or less

Mn is an essential element in the disclosure, as it concentrates in austenite phase to form austenite that is thermally stable even at ambient temperature. Mn contributes to the formation of the below-mentioned predetermined microstructure of the finished product, making it possible to obtain steel having high strength and high ductility. Mn also suppresses the formation of film-like ferrite from austenite grain boundaries in continuous casting and refines the austenite grain size, and so suppresses slab surface cracking and contributes to improved surface quality.

If the Mn content is not more than 3.0%, these effects are insufficient. The lower limit of the Mn content is therefore more than 3.0%. The Mn content is more preferably 3.5% or more, and still more preferably 4.0% or more. If the Mn content is more than 10.0%, the alloy cost increases, and hot ductility decreases considerably due to the formation of brittle phase. This causes surface cracking during continuous casting or hot rolling, and greatly lowers the yield rate. Moreover, wettability, chemical convertibility, and weldability are impaired. Accordingly, the Mn content is 10.0% or less. The Mn content is more preferably 8.0% or less, and particularly preferably 6.0% or less.

Ti: 0.010% or more and 0.300% or less

Ti forms fine carbonitride or cluster in the steel, and so contributes to finer austenite during casting. Ti also reduces precipitates, such as AlN, that embrittle austenite grain boundaries, and contributes to improved hot ductility. Ti is thus an essential element in the disclosure. Moreover, Ti refines the austenite grain size of the hot rolled coil to promote the development of rolling texture, and contributes to improved deep drawability of the annealed sheet. Ti is also crucial in the formation of microstructure in the hot-rolled and annealed sheet, and benefits the below-mentioned ferrite and austenite refinement and aspect ratio, thus enhancing the strength and formability of the finished product.

To achieve these effects, the Ti content needs to be at least 0.010%. To further enhance the effects, the Ti content is preferably 0.030% or more. If the Ti content is more than 0.300%, coarse TiN or a large amount of TiC forms and significantly degrades properties such as hot ductility, toughness, fatigue fracture resistance, and uniform elongation. The upper limit of the Ti content is therefore 0.300%. The Ti content is more preferably 0.200% or less, and further preferably 0.150% or less.

N: 0.0020% or more and 0.0100% or less

It is important in the disclosure to control the N content. N combines with Ti to form fine TiN, thus inhibiting the growth of austenite grains in the slab during casting and reducing surface cracking of the slab or hot rolled sheet. To achieve this effect, the N content needs to be 0.0020% or more. Excessively adding N over 0.0100%, however, causes the formation of coarse TiN which serves as a fracture origin, and degrades various properties such as hot ductility, toughness, fatigue fracture resistance, and hydrogen embrittlement resistance. Besides, excessive N, even in a solute state, facilitates the aging of the finished product considerably, and the resulting change in material quality might significantly impair ductility. The upper limit of the N content is therefore 0.0100%. In terms of the above, the N content is more preferably 0.0080% or less.

Moreover, it is important that the contents of the three components Mn, Ti, and N described above satisfy the following expression:

$$1.1 \le (Ti+Mn^{1/2}/400)/(0.01+5N) \le 6.0.$$

Excessively adding N relative to Ti or Mn causes coarsening of the austenite grain size in the slab surface layer during casting, and grain boundary embrittlement due to precipitation of MN and the like. Besides, once Ti is fixed by coarse TiN, fine Ti precipitates contributing to a refined annealed sheet decrease, leading to lower workability. Accordingly, the Ti content and the Mn content need to be appropriately balanced with the N content. As a result of extensive study, we discovered that, if $(Ti+Mn^{1/2}/400)/(0.01+5N)$ is 1.1 or more, steel that achieves both high strength and high workability of a finished product while suppressing slab surface cracking can be manufactured. The lower limit of the expression is therefore 1.1.

Meanwhile, excessively adding Ti and Mn over 6.0 saturates these effects, and leads to a significant decrease in hot ductility due to hard phase or brittle phase of Ti or Mn and a significant decrease in wettability caused by Mn as mentioned above. The upper limit of the expression is therefore 6.0. The value of the expression is more preferably 4.0 or less, and further preferably 2.5 or less.

The Mn content is preferably 3.5% to 8.0% in terms of obtaining the desired properties more stably, as mentioned above. In such a case, the lower limit of the expression is particularly preferably 1.2 in terms of achieving both high hot ductility and strength. This facilitates at least one of an increase of Ti and a decrease of N, thus suppressing cracking and enhancing strength by Ti more stably.

P: 0.05% or less

P is a strong solid-solution-strengthening element, and so contributes to higher strength of the steel. Excessively adding P, however, increases solidification segregation and promotes slab cracking. Besides, the material quality and welding strength of the product degrade, and the surface quality degrades as coating alloying is hampered. The upper limit of the P content is therefore 0.05%. The P content is preferably 0.020% or less, and more preferably 0.010% or less.

S: 0.01% or less

Excessively adding S promotes solidification segregation and decreases welding strength. Besides, MnS forms to decrease the workability of the steel sheet. Furthermore, red brittleness causes a decrease in hot ductility. The upper limit of the S content is therefore 0.01%. The S content is preferably 0.0030% or less, and more preferably 0.0020% or less.

Al: 1.5% or less

Al increases the amount of solute C in austenite, and thus contributes to improved stability of austenite. Al also expands the dual-phase temperature range during annealing, to reduce variation in secondary phase volume fraction during annealing and stabilize material quality. To achieve these effects, the Al content is preferably 0.1% or more. Meanwhile, excessively adding Al causes the formation of oxides on the steel sheet surface during annealing, and impairs wettability and chemical convertibility. To prevent this, the upper limit of the Al content is 1.5%. The Al content is more preferably 1.0% or less. In terms of ensuring better surface quality, the Al content is preferably 0.5% or less. The Al content is particularly preferably less than 0.3%.

The balance other than the basic components described above is Fe and incidental impurities.

In addition to the basic components described above, one or more of the following elements may be optionally added.

Cr, Ni, Mo, and Cu: 1.0% or less each

Cr, Ni, Mo, and Cu each have an effect of stabilizing austenite, and so are preferably added in the range of 0.02% or more each instead of Mn. Excessive addition, however, causes an increase in alloy cost. Accordingly, the content of each of these elements is 1.0% or less.

If Cu is added alone, Cu segregates to the crystal grain boundaries of the steel substrate during heating and melts, thus causing surface cracking. To prevent this, at least the same amount of Ni as the Cu content is preferably added.

Nb and V: 0.1% or less each

Nb and V each form a fine carbonitride and contribute to higher strength of the steel, and so are preferably added in the range of 0.005% or more each. During casting, however, their precipitates (carbonitrides) locally formed in austenite grain boundaries significantly decrease hot ductility. While the formation of carbonitrides of Nb and V can be effectively suppressed by intentionally adding Ti in the disclosed steel, adding these elements in a large amount can lead to the formation of carbonitrides. Accordingly, the content of each of these elements is 0.1% or less. The content of each of these elements is preferably 0.05%, and more preferably 0.02% or less. Particularly in terms of suppressing slab cracking, the content of each of these elements is preferably not more than half of the Ti content.

B: 0.0050% or less

B, even in a trace amount, has an effect of improving the quench hardenability of the steel, and may be added in the case where the formation of ferrite or bainite needs to be suppressed. To achieve this effect, the B content is preferably 0.0005% or more.

Meanwhile, as the B content increases, the hot strength of austenite increases, which makes hot rolling difficult. Accordingly, excessively adding B is not preferable. Moreover, in the annealing process, B concentrates on the surface and decreases wettability. To avoid these demerits, the upper limit of the B content is 0.0050%. The B content is more preferably 0.0015% or less.

Ca and REM: 1.0% or less each

Ca or REM may be added to control sulfide morphology in the steel and improve toughness and the like. Adding the element over 1.0%, however, increases the cost and saturates the effect. The upper limit of the content of each of these elements is therefore 1.0%.

Sn and Sb: 0.20% or less each

Sn or Sb suppresses decarburization, nitriding, or oxide formation on the steel sheet surface, and so may be added in order to improve surface quality and stabilize material quality. To achieve this effect, the content of each of these elements is preferably 0.006% or more. The content of each of these elements is more preferably 0.010% or more. Excessively adding the element, however, saturates the effect, and rather causes a decrease in ductility. The upper limit of the content of each of these elements is therefore 0.20%.

It is also important that a hot-rolled and annealed material for high strength steel sheets and a high strength steel sheet, which are manufactured using the material for high strength steel sheets according to the disclosure, each have the following microstructure.

[Microstructure]

The microstructure includes retained austenite phase and ferrite phase. In detail, the microstructure has ferrite as the main phase, and has at least retained austenite phase. This makes it possible to improve strength and ductility by the above-mentioned TRIP effect.

It is important that the ratio $\gamma Mn/\alpha Mn$ of the average Mn concentration ($\gamma Mn$) of retained austenite phase to the average Mn concentration ($\alpha Mn$) of ferrite phase in the microstructure is 1.5 or more in the hot-rolled and annealed material for high strength steel sheets, and 1.5 or more in the high strength steel sheet.

To obtain stable retained austenite, Mn in ferrite from among Mn in the whole composition needs to be distributed to austenite. If the ratio $\gamma Mn/\alpha Mn$ is less than 1.5 in the final cold rolled sheet stage, ferrite becomes hard and formability decreases, and also retained austenite becomes unstable and ductility decreases. Accordingly, the ratio $\gamma Mn/\alpha Mn$ needs to be 1.5 or more. The ratio $\gamma Mn/\alpha Mn$ is more preferably 3 or more, and still more preferably 6 or more. If the ratio $\gamma Mn/\alpha Mn$ is more than 20, the above-mentioned distribution is facilitated, but the stability of retained austenite increases excessively and the ductility improving effect is saturated. This in turns causes an excessively large difference in hardness between ferrite and austenite, as a result of which voids might form at the interface and decrease workability. Besides, to obtain a ratio $\gamma Mn/\alpha Mn$ of more than 20, heat treatment needs to be performed for a very long time. To avoid these problems, the upper limit of the ratio $\gamma Mn/\alpha Mn$ is preferably 20.

Here, the Mn concentration of each phase can be measured as follows.

For a sample obtained by mirror polishing a section parallel to the rolling direction (L direction) of the steel sheet, the Mn concentration distribution in a specific region is quantitatively analyzed with a probe diameter of 1 μm using an electron probe micro analyzer (EPMA), and then the phase type and distribution are identified in the same observation region by polishing and etching and/or electron backscatter diffraction (EBSD). The two data are combined to measure the Mn concentration.

The microstructure has ferrite as the main phase, and at least retained austenite phase as the secondary phase, as mentioned above. The secondary phase may also include martensite and bainite. The ratios of these phases are preferably as follow: ferrite: 30% to 80%, retained austenite: 10% to 60%, martensite: 5% to 40%, and bainite: 5% or less. In the description of the microstructure, "%" denotes "vol %" unless otherwise noted.

Ferrite: 30% to 80%

Ferrite having high deformation property is indispensable to obtain excellent ductility in the disclosure. If ferrite is less than 30%, workability such as ductility and hole expansion formability decreases significantly. The lower limit of the volume fraction of ferrite is therefore preferably 30%. If ferrite is more than 80%, desired strength is difficult to be obtained. Ferrite is therefore preferably 80% or less, and more preferably 70% or less.

Accordingly, the volume fraction of the secondary phase in the disclosed steel is preferably 20% to 70%. The "secondary phase" denotes all phases other than ferrite. An appropriate volume fraction range of each phase is described below.

Retained austenite: 10% to 60%

Retained austenite contributes to improved ductility by the TRIP effect during working, and so is an indispensable phase in the disclosure. If the volume fraction of retained austenite is less than 10%, it may be difficult to ensure desired strength, and excellent workability with that strength. The lower limit of the volume fraction of retained austenite is therefore preferably 10%. The volume fraction of retained austenite is more preferably 15% or more. Particularly in terms of achieving excellent ductility, the volume fraction of retained austenite is desirably 20% or more.

If retained austenite is excessive, neighboring retained austenite provides high strain to ferrite and facilitates strain hardening and void formation, as a result of which stretch flangeability and toughness decrease. The upper limit of the volume fraction of retained austenite is therefore preferably 60%. In terms of achieving higher ductility with the desired strength level, the volume fraction of retained austenite is desirably 50% or less.

Martensite: 5% to 40%

Martensite is a useful phase in facilitating strain hardening of ferrite in a low strain range to enable uniform strain hardening of the steel sheet. To achieve this effect, martensite is preferably 5% or more. If the amount of martensite is large, however, the volume fraction of retained austenite decreases relatively, and strain hardening of ferrite in the low strain range is facilitated excessively, so that a TRIP phenomenon of retained austenite is induced by lower strain. This causes a decrease in ductility. The upper limit of the volume fraction of martensite is therefore preferably 40%. Particularly in terms of achieving excellent ductility, the volume fraction of martensite is preferably not more than the volume fraction of retained austenite, more preferably not more than ⅔ of the volume fraction of retained austenite, and further preferably not more than ½ of the volume fraction of retained austenite.

Bainite: 5% or less

Bainite is not preferable as it causes carbon concentrated in austenite to precipitate as cementite in the annealing process and thus decreases the stability of retained austenite. The volume fraction of bainite is therefore preferably 5% or less. The volume fraction of bainite is more preferably 3% or less, and further preferably 1% or less.

The average grain size and average aspect ratio of retained austenite are preferably in the following ranges.

Average grain size of retained austenite: 2 μm or less

If the average grain size of retained austenite is 2 μm or less, the effect of hindering martensite transformation of retained austenite due to working strain and the effect of reducing strain accumulation from ferrite upon working are combined so that retained austenite remains even in a higher strain range and its TRIP phenomenon continues. As a result, ductility increases considerably. Accordingly, the average grain size of retained austenite is preferably 2 μm or less. No lower limit is placed on the average grain size of retained austenite, yet 0.1 μm or more is allowable in the disclosed manufacturing method because special treatment is needed to make the average grain size of retained austenite less than 0.1 μm.

Average aspect ratio of retained austenite: 1.2 to 4.0

Retained austenite grains preferably have form of extending in the rolling direction, in terms of improving ductility. Although the reason for this is not very clear, it is considered that, when the major axis of retained austenite lies along the sheet plane direction which is the macro deformation direction of the steel sheet in punching, stretch forming, and deep drawing, strain accumulation at the interface between retained austenite and ferrite is reduced so that retained austenite remains even in a higher strain range and void formation is suppressed. To achieve this effect, the average aspect ratio of retained austenite is preferably 1.2 or more. If the aspect ratio is more than 4.0, individual austenite grains are close to each other and assume connected morphology, which facilitates void formation and decreases workability. The average aspect ratio of austenite is therefore preferably 4.0 or less. The average aspect ratio is more preferably 3.0 or less, and further preferably 2.0 or less.

The ratio of the number of grains of retained austenite and the number of grains of ferrite is preferably in the following range.

Ratio of the number of grains of retained austenite to the number of grains of ferrite: 0.3 to 1.5

If the ferrite grain size is coarse relative to fine retained austenite, the diffusion path of Mn is not uniform and a region with low Mn concentration appears in retained austenite, which causes a decrease in ductility. Accordingly, the ratio obtained by dividing the number of grains of retained austenite by the number of grains of ferrite is preferably 1.5 or less. If ferrite grains are excessively fine and the ratio is less than 0.3, the TRIP effect by retained austenite does not uniformly act on all ferrite grains, as a result of which ductility may decrease. The ratio is therefore preferably 0.3 or more.

By limiting the above-mentioned ratio γMn/αMn to the predetermined range in each stage for the finished product, a high strength steel sheet having excellent formability can be ensured. The ratio γMn/αMn in each stage can be realized by the following manufacturing conditions with the above-mentioned chemical composition.

The manufacturing conditions of each of a material for high strength steel sheets, a hot rolled material for high strength steel sheets, a hot-rolled and annealed material for high strength steel sheets, a high strength steel sheet, a high strength hot-dip galvanized steel sheet, and a high strength electroplated steel sheet are described below.

[Material for High Strength Steel Sheets]

After obtaining molten steel having the above-mentioned composition by steelmaking, a material for high strength steel sheets, for example, a steel slab (including a steel strip), is produced by continuous casting (including thin slab casting), in terms of suppressing macrosegregation of components and enhancing manufacturing efficiency. In the continuous casting, it is important that cooling with a specific water content S of 0.5 L/kg steel or more and 2.5 L/kg steel or less is performed until the solidified shell surface layer portion temperature in the secondary cooling zone reaches 900° C., the slab is passed through the bending part and the straightening part at a temperature of 600° C. or more and 1150° C. or less, and then cooling with an average cooling rate from 400° C. to 200° C. of 1.0° C./s or less is performed.

Here, the solidified shell surface layer portion is a region from the slab surface to 2 mm in depth in a part from a corner portion of the slab to 150 mm in the transverse direction. The specific water content S (L/kg steel) is calculated by the following expression:

$$S=Q/(W\times Vc)$$

where Q is the cooling water content (L/min), W is the slab individual weight (kg steel/m), and Vc is the casting rate (m/min).

By setting the specific water content until the solidified shell surface layer portion temperature reaches 900° C. to 0.5 L/kg steel or more, the solidified shell is prevented from bulging to suppress a decrease in surface quality due to longitudinal cracking or cracking under the surface layer, and also internal cracking and central segregation are suppressed to improve the ductility and stretch flangeability of the finished product.

If the specific water content is more than 2.5 L/kg steel, the corner portion of the cast steel is cooled excessively, and tensile stress caused by the difference in thermal expansion from its surrounding high-temperature portion acts excessively to increase transverse cracking. The upper limit of the specific water content is therefore 2.5 L/kg steel.

The passing temperature in the bending part and the straightening part, i.e. the minimum temperature of the slab surface when passing through the bending part and the straightening part, is 600° C. or more and 1150° C. or less. Here, setting the passing temperature in the bending part and the straightening part to 1150° C. or less is effective in suppressing the above-mentioned bulging of the cast steel, and also necessary in order to reduce strain applied to the solidified shell and reduce surface cracking and internal cracking so that a product excellent in surface quality, ductility, and stretch flangeability is obtained. If the passing temperature is more than 1150° C., these effects decrease. Besides, coarse Ti precipitates to cause the coarsening of microstructure in the next step, resulting in degradation in TS-El balance of the finished product. In terms of the above, the passing temperature is more preferably 1050° C. or less, and further preferably 950° C. or less.

If the passing temperature in the bending part and the straightening part is less than 600° C., the slab becomes hard and the deformation load of the bending-straightening device increases. As a result, the roll life of the straightening part shortens, and light reduction rolling by narrowing the roll gap at the end of solidification is insufficient and central segregation degrades.

For high Mn steel, conventionally the above-mentioned temperature range is avoided to reduce transverse cracking, or slab mending is subsequently performed. However, the disclosed slab satisfying the above-mentioned steel composition and the relational expression of Ti and Mn can maintain favorable surface quality.

Further, the slab is cooled with an average cooling rate from 400° C. to 200° C. of 1.0° C./s or less, to suppress non-uniform transformation strain due to rapid martensite transformation in the slab. In this way, the slab is prevented from quench cracking or aging cracking (and resulting surface cracking), with the above-mentioned refinement of the austenite grain size. Since the slab is prevented from surface cracking, it is possible to apply an energy-saving process of delivering the slab as a warm slab in the next hot rolling. In terms of suppressing cracking, the average cooling rate is more preferably 0.1° C./s or less, and further preferably 0.05° C./s or less.

The material for high strength steel sheets (slab) obtained according to these casting conditions has a microstructure having martensite as the main phase. Here, an advantageous way of limiting the ratio γMn/αMn in the hot-rolled and annealed material for high strength steel sheets and the high strength steel sheet to the above-mentioned range is to limit the degree of segregation of Mn in the material for high strength steel sheets as their starting material to a predetermined range. In detail, ΔMn which is variation in Mn concentration according to the following Expression (2) is set to 0.45% or more. When ΔMn is 0.45% or more, the ratio γMn/αMn in the hot-rolled and annealed material for high strength steel sheets and the high strength steel sheet can be limited to the desired range.

$$\Delta Mn=\Sigma(Mn_{max,i}-Mn_{min,i})/i \qquad (2)$$

where $Mn_{max,i}$ and $Mn_{min,i}$ are respectively the maximum concentration of the positive segregation area (interdendrite) of Mn and the minimum concentration of the negative segregation area (dendrite stem) of Mn at adjacent measurement points in EPMA linear analysis (beam diameter: 1 μm) for any 10 mm interval in the transverse direction at a depth position of ¼ of the thickness t from the material surface, and ΔMn is the average of the concentration differences of a total of i positive and negative segregation pairs in 10 mm intervals.

ΔMn of 0.45% or more can be achieved by, when continuous casting the steel having the composition in the disclosed range, performing cooling from the liquidus temperature to the solidus temperature with the cooling rate at a position of ¼ of the slab thickness t being 10° C./s or less. This condition can be adequately satisfied by the manufacturing condition according to the disclosure that the specific water content of a secondary cooling spray is 0.5 L/kg steel to 2.5 L/kg steel. If quenching is performed with the cooling rate exceeding 10° C./s, sufficient Mn concentration deviation cannot be obtained, and the properties of the finished product degrade.

[Hot Rolled Material for High Strength Steel Sheets]

The material for high strength steel sheets (slab) is hot rolled at a finisher delivery temperature of $Ar_3$ point or more, then coiled in a temperature range of [Ms point+50° C.] or more and 700° C. or less, and cooled to 200° C. or less. A hot rolled material for high strength steel sheets is thus obtained.

First, the slab is hot rolled at a finisher delivery temperature of $Ar_3$ transformation point or more, to yield a hot rolled sheet. If the finisher delivery temperature is less than $Ar_3$ transformation point, an increase in hot deformation resistance hampers the hot rolling. If the finisher delivery temperature is more than 1000° C., thick scale might form on the surface and degrade surface quality. The finisher delivery temperature is therefore preferably 1000° C. or less. For better surface quality, the finisher delivery temperature is preferably 950° C. or less.

In the process of reheating the slab having the above-mentioned composition, the presence of fine Ti precipitates has an additional effect of refining the austenite grain size to refine the final microstructure and thus improve the TS-El balance. However, these Ti-based precipitates need to be sufficiently molten before the hot rolling, so that the slab is preferably reheated to 1100° C. or more. The slab is more preferably reheated to 1200° C. or more. If the slab is reheated to more than 1300° C., an increase of scale loss and the formation of non-uniform scale in the hot rolled sheet results in degraded surface quality. The upper limit is therefore preferably 1300° C.

Immediately after the hot rolling, the steel sheet is cooled to a temperature range of [Ms point+50° C.] or more and 700° C. or less at any cooling rate, and coiled in the temperature range. If the coiling is performed in a temperature range of Ms point or less, the whole steel sheet rapidly transforms into martensite, as a result of which waviness or edge cracking might occur in the sheet and cause a decrease in surface quality or yield rate. To prevent this, the coiling is performed in a temperature range higher than Ms point by at least 50° C. If the coiling temperature is more than 700° C., the scale thickness increases to degrade surface quality. The coiling temperature is therefore 700° C. or less.

In the hot rolled material yielded as a result of the hot rolling and the coiling, the above-mentioned variation $\Delta Mn$ of Mn concentration according to Expression (2) is 0.50% or more.

[Hot-Rolled and Annealed Material for High Strength Steel Sheets]

The hot rolled material for high strength steel sheets, having been coiled in a temperature range of [Ms point+50° C.] or more and 700° C. or less, is cooled to 200° C. or less, and then subjected to intermediate heat treatment of holding it in a temperature range of [$Ac_1$ transformation point−200° C.] or more and [$Ac_1$ transformation point+100° C.] or less for 30 min or more. A hot-rolled and annealed material for high strength steel sheets with a ratio $\gamma Mn/\alpha Mn$ of 1.5 or more can thus be obtained.

By holding the hot rolled coil after the coiling in a temperature range of [$Ac_1$ transformation point−200° C.] or more and [$Ac_1$ transformation point+100° C.] or less for 30 min or more, hard low-temperature transformation-induced phase such as martensite and bainite is tempered, thus reducing the rolling load of the hot rolled sheet. Moreover, austenite phase forms from a portion high in Mn concentration, which further facilitates the concentration of Mn from ferrite, tempered martensite, or bainite. If the holding temperature is outside the above-mentioned temperature range or the holding time is short, these effects cannot be achieved. If the holding time is more than 750 min, the effects are saturated, and the manufacturing cost increases. The holding time is therefore preferably 750 min or less. The hot rolled coil held in this temperature range is cooled to 200° C. or less.

As described above, by performing the intermediate heat treatment after the coiling, the ratio $\gamma Mn/\alpha Mn$ in the hot rolled material can be limited to 1.5 or more.

[High Strength Steel Sheet]

The hot rolled coil after the coiling or the intermediate heat treatment is pickled according to a conventional method, and then cold rolled or warm rolled at a rolling reduction of preferably 15% or more, to form a cold rolled sheet. If the rolling reduction is less than 15%, ferrite recrystallization in the subsequent annealing process is insufficient, and worked microstructure remains to cause a decrease in workability. The rolling reduction is preferably 20% or more, and more preferably 25% or more. The warm rolling is preferably performed with the steel strip being reheated to 150° C. to 600° C. This increases the stability of retained austenite, and hinders its martensite transformation due to rolling strain, so that an increase in deformation resistance of the rolling can be suppressed. If the warm rolling temperature is less than 150° C., this effect is poor. A warm rolling temperature of more than 600° C. is not preferable because scale defects might appear on the steel sheet surface and degrade surface quality. No upper limit needs to be placed on the rolling reduction, yet a rolling reduction of more than 80% imposes an excessive load on the line and so the rolling reduction is preferably 80% or less.

After the cold rolling or warm rolling, the steel sheet is held in a temperature range of $Ac_1$ transformation point or more and [$Ac_1$ transformation point+($Ac_3$ transformation point−$Ac_1$ transformation point)/2] or less for 30 sec or more and 400 min or less, to cause austenite phase to form and C and Mn to concentrate. If the annealing is performed at a low temperature, i.e. a heat treatment temperature of less than $Ac_1$ transformation point, or for a short time of less than 30 sec, carbides melt insufficiently and the volume fraction and stability of austenite decrease, which causes a decrease in ductility. If the holding temperature is more than the temperature range, the amount of austenite formed increases, and the C and Mn concentrations of individual austenite decrease to lower the stability of austenite, which causes a decrease in ductility. Moreover, individual austenite grains are connected to thus increase the aspect ratio, as a result of which various properties such as blanking workability, toughness, and bendability degrade. Besides, if the holding time is more than 400 min, ferrite or austenite crystal grains coarsen and cause a decrease in strength and ductility, or Ti precipitates coarsen and cause a decrease in tensile strength.

The heating process that leads to the holding in the above-mentioned temperature range is preferably performed by heating the steel sheet in a temperature range of [$Ac_1$ transformation point−200° C.] or more and $Ac_1$ transformation point or less at an average heating rate of preferably 1.5° C./s or more and 10° C./s or less. In this way, Ti carbide or Ti cluster inhibits ferrite grain growth and refines the microstructure, with it being possible to improve ductility. If the average heating rate is less than 1.5° C./s, ferrite grain growth is facilitated and the ferrite or austenite grain size coarsens, which can lead to a decrease in strength or ductility. If the average heating rate is more than 10° C./s, non-recrystallized microstructure of ferrite remains and the number of ferrite grains increases extremely over the number of austenite grains, which can lead to a decrease in ductility.

The cooling rate and the cooling method after the soaking are not limited. If the cooling rate is extremely low, cementite forms from austenite, which can cause a decrease in stability. Accordingly, the cooling is preferably performed to 200° C. or less at 0.01° C./s or more. If the cooling rate is extremely high, waviness tends to appear in the steel sheet shape, and so the cooling rate is preferably 100° C./s or less.

The annealing is performed in a continuous annealing line (CAL), a continuous hot-dip galvanizing line (CGL), or a batch annealing furnace (BAF). Although the annealing is preferably performed by one heat treatment, the annealing may be performed a plurality of times by the same annealing method or different annealing methods, with cooling being applied between the annealing operations. In such a case, the total soaking time is limited to 30 sec or more and 400 min or less.

In the case where the hot rolled coil after the coiling is subjected to the cold rolling and the annealing, a ratio $\gamma Mn/\alpha Mn$ of 1.5 or more is obtained as a result of the cold rolling and the annealing. In the case where the hot rolled coil after the intermediate heat treatment is subjected to the cold rolling and the annealing, on the other hand, a ratio $\gamma Mn/\alpha Mn$ of 1.7 or more is obtained as a result of the cold rolling and the annealing.

The cold rolled steel sheet may then be subjected to metal coating or plating. Examples of the metal coating or plating include hot-dip galvanizing (including alloying), electrogalvanizing, hot-dip aluminum coating, and electric aluminum plating. These are described below, starting from hot-dip galvanizing.

[High Strength Hot-Dip Galvanized Steel Sheet]

In the case of performing hot-dip galvanizing, the following treatment is preferably performed in the cooling process after the annealing. In the case where the annealing is performed a plurality of times, the following treatment is performed in the final annealing. The steel sheet after the soaking annealing under the above-mentioned conditions is cooled to 500° C. or less at an average cooling rate of 0.01° C./s or more and 100° C./s or less, and immersed in a hot-dip galvanizing bath. Immediately after the immersion in the hot-dip galvanizing bath, the steel sheet is cooled to 100° C. or less at a cooling rate of 0.01° C./s or more and 100° C./s or less. Alternatively, immediately after the immersion in the hot-dip galvanizing bath, the steel sheet is held in a temperature range of 450° C. or more and 650° C. or less for 10 sec or more to alloy the coating, and then cooled to 100° C. or less at a cooling rate of 0.01° C./s or more and 100° C./s or less. If the average cooling rate is less than 0.01° C./s, cementite or bainite forms, which can cause a decrease in ductility. If the average cooling rate is more than 100° C./s, wrinkle, waviness, or cracking might appear in the steel sheet.

[High Strength Hot-Dip Aluminum Coated Steel Sheet]

Hot-dip aluminum coating may be performed. The following treatment is preferably performed in the cooling process after the annealing. In the case where the annealing is performed a plurality of times, the following treatment is performed in the final annealing. The steel sheet after the annealing is cooled to 700° C. or less at a cooling rate of 0.01° C./s or more and 100° C./s or less, and immersed in a hot-dip aluminum coating bath. Immediately after the immersion in the hot-dip aluminum coating bath, the steel sheet is cooled to 100° C. or less at a cooling rate of 0.01° C./s or more and 100° C./s or less. Alternatively, immediately after the immersion in the hot-dip aluminum coating bath, the steel sheet is held in a temperature range of 700° C. or more and 800° C. or less for 10 sec or more to facilitate alloying the coating, and then cooled to 100° C. or less at a cooling rate of 0.01° C./s or more and 100° C./s or less.

[High Strength Electroplated Steel Sheet]

The cold rolled steel sheet, the hot-dip galvanized steel sheet, or the hot-dip aluminum-coated steel sheet obtained as a result of the annealing may be electrogalvanized after cooling. As the conditions for the electrogalvanizing, the steel sheet may be placed in a plating tank and electrogalvanized according to a conventional method.

The following tempering and temper rolling may be optionally performed.

[Tempering]

The steel sheet with martensite formed therein, which is obtained after performing the annealing or any of the coating or plating treatments and then cooling to 300° C. or less, may be additionally subjected to tempering of holding the steel sheet in a temperature range of 100° C. or more and $Ac_1$ transformation point or less for 30 sec or more, in order to improve ductility and blanking workability by tempering the martensite.

[Temper Rolling]

The cold rolled steel sheet or coated steel sheet obtained in this way may be subjected to temper rolling, in order to eliminate yield point elongation, adjust coating surface roughness, or adjust the steel sheet shape. If the elongation rate is excessively high, ductility decreases. The elongation rate is therefore preferably 2% or less.

EXAMPLES

Each steel having the chemical composition listed in Table 1 with the balance being Fe and incidental impurities was obtained by steelmaking in a converter, and then continuously cast under the conditions listed in Table 2, to obtain a slab of 250 mm in thickness. The obtained slab was then hot rolled under the conditions listed in Table 3, to obtain a hot rolled sheet of 3.2 mm in thickness. The hot rolled sheet was further subjected to intermediate heat treatment under the conditions listed in Table 4. The hot rolled sheet was then cold rolled at the rolling reduction listed in Table 5, to obtain a cold rolled sheet of 1.6 mm in thickness. The cold rolled sheet was annealed once or twice under the conditions listed in Table 5. Each hot-dip galvanized steel sheet was yielded by forming, on both sides, a galvanized coating of 45±3 g/m² per side and a Fe concentration in the coating of 10±1 mass %, and alloying the coating at 500° C.

The Ms point, $A_{C1}$ point, and $A_{C3}$ point of each steel were calculated from the following expressions. Here, $A_{r3}$ point is equal to Ms point.

$$Ms\ point = 561 - 474C - 33Mn - 17Cr - 17Ni - 21Mo$$

$$A_{C1}\ point = 751 - 16C + 11Si - 28Mn - 5.5Cu - 16Ni + 13Cr + 3.4Mo$$

$$A_{C3}\ point = 910 - 203(C)^{1/2} + 45Si - 30Mn - 20Cu - 15Ni + 11Cr + 32Mo + 104V + 400Ti + 200Al$$

TABLE 1

| | Chemical composition (mass %) | | | | | | | | | | | | | | | |
|---|---|---|---|---|---|---|---|---|---|---|---|---|---|---|---|---|
| Steel | C | Si | Mn | P | S | Al | Ti | N | Nb | V | Cr | Ni | Cu | Mo | Sb | Sn |
| A | 0.125 | 0.33 | 5.12 | 0.020 | 0.0010 | 0.033 | 0.039 | 0.0036 | — | — | 0.22 | 0.03 | — | — | 0.008 | — |
| B | 0.165 | 0.01 | 4.90 | 0.008 | 0.0015 | 0.043 | 0.040 | 0.0073 | — | — | — | — | — | — | — | — |
| C | 0.189 | 0.48 | 7.21 | 0.015 | 0.0011 | 0.033 | 0.032 | 0.0045 | — | — | — | — | 0.05 | 0.03 | 0.005 | — |
| D | 0.051 | 0.23 | 4.89 | 0.030 | 0.0013 | 0.981 | 0.056 | 0.0048 | — | — | — | — | — | — | — | 0.006 |
| E | 0.390 | 0.35 | 3.55 | 0.020 | 0.0016 | 0.044 | 0.450 | 0.0057 | — | — | — | — | — | — | 0.007 | — |
| F | 0.151 | 0.22 | 6.21 | 0.035 | 0.0013 | 0.078 | 0.055 | 0.0039 | 0.008 | 0.009 | 0.35 | — | — | 0.03 | — | — |
| G | 0.211 | 0.31 | 3.67 | 0.009 | 0.0010 | 0.055 | 0.051 | 0.0033 | 0.015 | 0.021 | — | — | — | — | — | — |
| H | 0.086 | 0.01 | 5.66 | 0.014 | 0.0011 | 0.034 | 0.036 | 0.0040 | — | — | — | — | — | — | — | — |
| I | 0.137 | 0.01 | 5.01 | 0.008 | 0.0023 | 0.035 | 0.035 | 0.0035 | 0.010 | — | — | — | — | — | — | — |
| J | 0.115 | 0.02 | 5.30 | 0.021 | 0.0021 | 0.037 | 0.035 | 0.0095 | — | — | — | — | — | — | — | — |
| K | 0.250 | 2.32 | 6.62 | 0.062 | 0.0011 | 0.036 | 0.064 | 0.0034 | — | — | — | — | — | — | — | — |
| L | 0.086 | 0.15 | 3.10 | 0.016 | 0.0014 | 0.035 | 0.011 | 0.0019 | 0.033 | — | 0.11 | — | 0.12 | — | — | — |
| M | 0.277 | 1.10 | 12.4 | 0.011 | 0.0010 | 0.044 | 0.031 | 0.0023 | — | — | — | — | — | — | — | — |
| N | 0.088 | 0.33 | 9.60 | 0.022 | 0.0015 | 0.053 | 0.045 | 0.0036 | — | — | — | — | — | — | — | — |

TABLE 1-continued

| | | | | | | | | | | | | | | | | |
|---|---|---|---|---|---|---|---|---|---|---|---|---|---|---|---|---|
| O | 0.133 | 0.23 | 3.00 | 0.011 | 0.0012 | 0.055 | 0.032 | 0.0035 | — | — | — | — | — | — | — | — |
| P | 0.066 | 0.55 | 6.10 | 0.005 | 0.0005 | 1.89 | 0.055 | 0.0167 | — | — | — | — | — | — | — | — |
| Q | 0.112 | 1.45 | 7.03 | 0.004 | 0.0005 | 0.15 | 0.023 | 0.0028 | — | — | — | — | — | — | — | — |
| R | 0.210 | 0.94 | 4.52 | 0.015 | 0.029 | 0.088 | 0.080 | 0.0036 | — | — | — | — | — | — | — | — |

| Steel | Chemical composition (mass %) B | Ca | REM | Ms point (° C.) | Ac1 point (° C.) | Ac3 point (° C.) | ([Ti] + [Mn]$^{1/2}$/400)/(0.01 + 5[N]) | Remarks |
|---|---|---|---|---|---|---|---|---|
| A | — | 0.005 | — | 329 | 612 | 724 | 1.59 | Conforming steel |
| B | — | — | — | 321 | 611 | 706 | 0.98 | Comparative steel |
| C | — | 0.007 | — | 233 | 551 | 646 | 1.19 | Conforming steel |
| D | — | — | 0.004 | 375 | 616 | 946 | 1.81 | Comparative steel |
| E | 0.0007 | 0.005 | — | 259 | 649 | 881 | 11.81 | Comparative steel |
| F | 0.0009 | — | — | 278 | 582 | 698 | 2.08 | Conforming steel |
| G | 0.0007 | — | — | 340 | 648 | 754 | 2.11 | Conforming steel |
| H | — | — | — | 333 | 591 | 702 | 1.40 | Conforming steel |
| I | — | — | — | 331 | 609 | 694 | 0.35 | Comparative steel |
| J | — | — | — | 332 | 601 | 704 | 0.71 | Comparative steel |
| K | — | — | — | 224 | 587 | 747 | 2.61 | Comparative steel |
| L | — | — | — | 416 | 665 | 774 | 0.79 | Comparative steel |
| M | — | — | — | 21 | 411 | 502 | 1.85 | Comparative steel |
| N | — | 0.003 | — | 202 | 484 | 605 | 1.88 | Conforming steel |
| O | — | — | — | 399 | 667 | 780 | 1.32 | Comparative steel |
| P | — | — | — | 328 | 585 | 1100 | 0.65 | Comparative steel |
| Q | — | — | — | 276 | 568 | 736 | 1.23 | Conforming steel |
| R | — | — | — | 312 | 631 | 773 | 3.05 | Comparative steel |

TABLE 2

| Slab ID | Steel ID | Casting conditions Specific water content to 900° C. (L/kg steel) | Bending part passing temperature (° C.) | Straightening part passing temperature (° C.) | Cooling rate from 400 to 200° C. (° C./s) | ΔMn (%) | Slab cracking | Average hot ductility at 700 to 800° C. (%) | Remarks |
|---|---|---|---|---|---|---|---|---|---|
| 1S | A | 0.4 | 1160 | 915 | 0.03 | 0.65 | 3 | 74 | Comparative Example |
| 2S | A | 2.0 | 800 | 650 | 0.01 | 0.62 | 1 | | Example |
| 3S | A | 3.5 | 800 | 320 | 0.01 | 0.60 | 3 | | Comparative Example |
| 4S | A | 5.5 | 590 | 180 | 0.01 | 0.39 | 4 | | Comparative Example |
| 5S | A | 2.0 | 800 | 650 | 5.5 | 0.65 | 3 | | Comparative Example |
| 6S | A | 0.5 | 1150 | 900 | 0.01 | 0.66 | 1 | | Example |
| 7S | A | 0.9 | 980 | 800 | 0.01 | 0.63 | 1 | | Example |
| 7-1S | A | 2.0 | 650 | 550 | 0.01 | 0.61 | 4 | | Comparative Example |
| 7-2S | A | 0.5 | 1200 | 1200 | 0.01 | 0.62 | 4 | | Comparative Example |
| 8S | B | 2.0 | 800 | 650 | 0.01 | 0.60 | 3 | 43 | Comparative Example |
| 9S | C | 2.0 | 800 | 650 | 0.01 | 0.84 | 1 | 80 | Example |
| 10S | C | 1.0 | 900 | 740 | 0.01 | 0.85 | 1 | | Example |
| 11S | C | 0.9 | 910 | 740 | 1.2 | 0.85 | 3 | | Comparative Example |
| 12S | D | 2.0 | 800 | 650 | 0.01 | 0.58 | 1 | 72 | Comparative Example |
| 13S | E | 2.0 | 800 | 650 | 0.01 | 0.49 | 4 | 17 | Comparative Example |
| 14S | F | 2.0 | 800 | 650 | 0.01 | 0.71 | 1 | 75 | Example |
| 15S | F | 1.1 | 850 | 720 | 0.01 | 0.73 | 1 | | Example |
| 16S | G | 2.0 | 800 | 650 | 0.01 | 0.47 | 2 | 67 | Example |
| 17S | G | 1.0 | 910 | 740 | 0.01 | 0.48 | 2 | | Example |
| 18S | H | 2.0 | 800 | 650 | 0.01 | 0.66 | 1 | 75 | Example |
| 19S | I | 2.0 | 800 | 650 | 0.01 | 0.61 | 3 | 33 | Comparative Example |
| 20S | J | 2.0 | 800 | 650 | 0.01 | 0.67 | 4 | 34 | Comparative Example |
| 21S | K | 2.0 | 800 | 650 | 0.01 | 0.74 | 3 | 58 | Comparative Example |
| 22S | L | 2.0 | 800 | 650 | 0.01 | 0.40 | 3 | 31 | Comparative Example |
| 23S | M | 2.0 | 800 | 650 | 0.01 | 1.36 | 4 | 24 | Comparative Example |
| 24S | N | 2.0 | 800 | 650 | 0.01 | 1.03 | 1 | 75 | Example |
| 25S | O | 2.0 | 800 | 650 | 0.01 | 0.33 | 1 | 53 | Comparative Example |
| 26S | P | 1.3 | 860 | 710 | 0.01 | 0.63 | 4 | 22 | Comparative Example |
| 27S | Q | 2.0 | 800 | 650 | 0.01 | 0.76 | 1 | 79 | Example |
| 28S | R | 2.0 | 800 | 650 | 0.01 | 0.65 | 4 | 21 | Comparative Example |

TABLE 3

| As hot rolled material ID | Slab ID | Steel ID | Finish temperature (° C.) | Coiling temperature (° C.) | ΔMn (%) | Surface appearance of hot rolled sheet | Remarks |
|---|---|---|---|---|---|---|---|
| 1H | 1S | A | 910 | 600 | 0.68 | Poor | Comparative Example |
| 2H | 2S | A | 910 | 600 | 0.63 | Good | Example |
| 3H | 2S | A | 960 | 750 | 0.64 | Good | Comparative Example |
| 4H | 2S | A | 910 | 320 | 0.63 | Poor | Comparative Example |
| 5H | 2S | A | 1030 | 750 | 0.64 | Poor | Comparative Example |
| 6H | 3S | A | 910 | 600 | 0.61 | Poor | Comparative Example |
| 7H | 4S | A | 905 | 600 | 0.42 | Poor | Comparative Example |
| 8H | 5S | A | 900 | 600 | 0.66 | Poor | Comparative Example |
| 9H | 6S | A | 890 | 550 | 0.67 | Good | Example |
| 10H | 7S | A | 890 | 550 | 0.65 | Good | Example |
| 10-1H | 7-1S | A | 890 | 580 | 0.65 | Poor | Comparative Example |
| 10-2H | 7-2S | A | 890 | 580 | 0.66 | Poor | Comparative Example |
| 11H | 8S | B | 910 | 600 | 0.63 | Poor | Comparative Example |
| 12H | 9S | C | 910 | 600 | 0.87 | Good | Example |
| 13H | 10S | C | 925 | 620 | 0.87 | Good | Example |
| 14H | 10S | C | 870 | 250 | 0.86 | Poor | Comparative Example |
| 15H | 11S | C | 910 | 600 | 0.89 | Poor | Comparative Example |
| 16H | 12S | D | 910 | 600 | 0.63 | Good | Comparative Example |
| 17H | 13S | E | 910 | 600 | 0.56 | Poor | Comparative Example |
| 18H | 14S | F | 910 | 600 | 0.74 | Good | Example |
| 19H | 15S | F | 900 | 580 | 0.75 | Good | Example |
| 20H | 16S | G | 910 | 600 | 0.50 | Poor | Example |
| 21H | 17S | G | 920 | 630 | 0.53 | Poor | Example |
| 22H | 18S | H | 910 | 600 | 0.70 | Good | Example |
| 23H | 19S | I | 900 | 600 | 0.66 | Poor | Comparative Example |
| 24H | 20S | J | 900 | 600 | 0.68 | Poor | Comparative Example |
| 25H | 21S | K | 900 | 600 | 0.79 | Poor | Comparative Example |
| 26H | 22S | L | 900 | 600 | 0.45 | Poor | Comparative Example |
| 27H | 23S | M | 900 | 600 | 1.41 | Poor | Comparative Example |
| 28H | 24S | N | 900 | 600 | 1.10 | Good | Example |
| 29H | 25S | O | 900 | 600 | 0.34 | Good | Comparative Example |
| 30H | 26S | P | 910 | 600 | 0.66 | Poor | Example |
| 31H | 27S | Q | 910 | 600 | 0.79 | Good | Example |
| 32H | 28S | R | 910 | 600 | 0.67 | Poor | Example |

TABLE 4

| Hot-rolled and heat-treated material ID | As hot rolled material ID | Steel ID | Heat treatment Heating temperature (° C.) | Heat treatment time (min) | Cooling temperature (° C.) | Hot-rolled and annealed sheet microstructure Secondary phase volume fraction (%) | Retained γ volume fraction (%) | M volume fraction (%) | B volume fraction (%) |
|---|---|---|---|---|---|---|---|---|---|
| 1Ht | 1H | A | 650 | 240 | 25 | 42.4 | 25.6 | 16.8 | 0.0 |
| 2Ht | 2H | A | 650 | 240 | 25 | 43.8 | 28.3 | 15.5 | 0.0 |
| 3Ht | 6H | A | 650 | 240 | 25 | 45.8 | 29.1 | 16.6 | 0.1 |
| 4Ht | 7H | A | 620 | 120 | 25 | 37.2 | 20.0 | 17.2 | 0.0 |
| 5Ht | 8H | A | 650 | 240 | 25 | 45.4 | 28.0 | 17.4 | 0.0 |
| 6Ht | 9H | A | 620 | 120 | 25 | 48.1 | 30.2 | 17.9 | 0.0 |
| 7Ht | 10H | A | 650 | 200 | 25 | 44.5 | 29.4 | 15.1 | 0.0 |
| 7-1Ht | 10-1H | A | 650 | 120 | 25 | 45.5 | 28.6 | 16.9 | 0.0 |
| 7-2Ht | 10-2H | A | 650 | 120 | 25 | 46.6 | 31.0 | 15.6 | 0.0 |
| 8Ht | 3H | A | 650 | 240 | 25 | 46.9 | 29.6 | 17.1 | 0.2 |
| 9Ht | 4H | A | 650 | 240 | 25 | 45.0 | 28.3 | 16.7 | 0.0 |
| 10Ht | 5H | A | 650 | 240 | 25 | 46.2 | 30.0 | 16.2 | 0.0 |
| 11Ht | 2H | A | 300 | 240 | 25 | 35.0 | 9.5 | 25.5 | 0.0 |
| 12Ht | 2H | A | 650 | 15 | 25 | 44.0 | 12.2 | 26.3 | 5.5 |
| 13Ht | 2H | A | 650 | 45 | 25 | 44.3 | 26.4 | 17.9 | 0.0 |
| 14Ht | 2H | A | 730 | 60 | 25 | 100.0 | 3.4 | 96.6 | 0.0 |
| 15Ht | 11H | B | 650 | 240 | 25 | 42.6 | 27.1 | 15.5 | 0.0 |
| 16Ht | 12H | C | 620 | 240 | 25 | 64.1 | 38.8 | 25.3 | 0.0 |
| 17Ht | 13H | C | 600 | 120 | 25 | 63.0 | 35.5 | 27.5 | 0.0 |
| 18Ht | 14H | C | 600 | 120 | 25 | 61.2 | 36.7 | 24.5 | 0.0 |
| 19Ht | 15H | C | 600 | 120 | 25 | 62.8 | 35.0 | 27.8 | 0.0 |
| 20Ht | 16H | D | 650 | 240 | 25 | 28.4 | 5.1 | 19.9 | 3.4 |
| 21Ht | 17H | E | 650 | 240 | 25 | 64.3 | 19.8 | 36.4 | 8.1 |
| 22Ht | 18H | F | 650 | 240 | 25 | 51.3 | 32.5 | 18.8 | 0.0 |
| 23Ht | 19H | F | 580 | 300 | 25 | 46.6 | 30.0 | 16.6 | 0.0 |
| 24Ht | 20H | G | 650 | 240 | 25 | 41.5 | 20.8 | 20.2 | 0.5 |

TABLE 4-continued

| | | | | | | | | |
|---|---|---|---|---|---|---|---|---|
| 25Ht | 21H | G | 620 | 360 | 25 | 36.4 | 20.5 | 15.0 | 0.9 |
| 26Ht | 22H | H | 650 | 240 | 25 | 46.6 | 28.6 | 18.0 | 0.0 |
| 27Ht | 23H | I | 650 | 240 | 25 | 44.6 | 28.4 | 16.2 | 0.0 |
| 28Ht | 24H | J | 650 | 240 | 25 | 55.5 | 35.6 | 19.9 | 0.0 |
| 29Ht | 25H | K | 650 | 240 | 25 | 45.1 | 24.5 | 20.6 | 0.0 |
| 30Ht | 26H | L | 650 | 240 | 25 | 48.8 | 9.9 | 26.4 | 12.5 |
| 31Ht | 27H | M | 450 | 240 | 25 | 70.4 | 50.1 | 20.3 | 0.0 |
| 32Ht | 28H | N | 550 | 240 | 25 | 57.7 | 35.2 | 22.5 | 0.0 |
| 33Ht | 29H | O | 720 | 240 | 25 | 52.5 | 6.6 | 15.3 | 30.6 |
| 34Ht | 30H | P | 600 | 120 | 25 | 21.0 | 10.3 | 9.5 | 1.2 |
| 35Ht | 31H | Q | 590 | 300 | 25 | 56.2 | 34.2 | 22.0 | 0.0 |
| 36Ht | 32H | R | 620 | 240 | 25 | 58.0 | 32.4 | 25.6 | 0.0 |

| Hot-rolled and heat-treated material ID | Hot-rolled and annealed sheet microstructure | | | | Mechanical properties | | | | | |
|---|---|---|---|---|---|---|---|---|---|---|
| | Retained γ average grain size (μm) | Retained γ average aspect ratio | Retained γ/F grain number ratio | Ratio γMn/αMn | Tensile strength TS (MPa) | Total elongation El (%) | TS × El (MPa %) | λ (%) | Surface appearance | Remarks |
| 1Ht | 1.8 | 1.5 | 1.0 | 2.4 | 1002 | 29.9 | 29960 | 11 | Poor | Comparative Example |
| 2Ht | 1.7 | 1.7 | 1.1 | 3.2 | 1026 | 31.2 | 32011 | 34 | Good | Example |
| 3Ht | 1.7 | 1.8 | 0.9 | 2.9 | 1055 | 30.8 | 32494 | 35 | Poor | Comparative Example |
| 4Ht | 2.5 | 2.1 | 0.5 | 1.2 | 973 | 25.3 | 24617 | 41 | Poor | Comparative Example |
| 5Ht | 1.6 | 1.9 | 0.9 | 2.4 | 1022 | 32.0 | 32704 | 31 | Poor | Comparative Example |
| 6Ht | 1.3 | 1.8 | 1.2 | 3.5 | 1061 | 29.7 | 31512 | 38 | Good | Example |
| 7Ht | 1.8 | 2.0 | 0.9 | 3.2 | 1018 | 30.9 | 31456 | 40 | Good | Example |
| 7-1Ht | 1.5 | 1.6 | 1.2 | 3.3 | 1026 | 30.7 | 31498 | 33 | Poor | Comparative Example |
| 7-2Ht | 1.7 | 1.7 | 1.0 | 3.1 | 1020 | 31.3 | 31926 | 35 | Poor | Comparative Example |
| 8Ht | 1.8 | 1.8 | 1.2 | 2.6 | 1050 | 31.5 | 33075 | 34 | Poor | Comparative Example |
| 9Ht | 1.7 | 1.7 | 1.0 | 2.9 | 1031 | 30.8 | 31755 | 36 | Poor | Comparative Example |
| 10Ht | 1.6 | 1.8 | 1.0 | 2.8 | 1055 | 28.7 | 31755 | 33 | Poor | Comparative Example |
| 11Ht | 1.6 | 7.7 | 0.4 | 1.3 | 1288 | 11.2 | 14426 | 45 | Good | Comparative Example |
| 12Ht | 1.7 | 6.4 | 0.6 | 1.2 | 1109 | 15.5 | 17190 | 23 | Good | Comparative Example |
| 13Ht | 1.5 | 1.8 | 1.0 | 2.4 | 1056 | 28.9 | 30518 | 35 | Good | Example |
| 14Ht | 0.3 | 6.5 | 0.1 | 1.4 | 1699 | 9.9 | 16820 | 51 | Good | Comparative Example |
| 15Ht | 1.9 | 1.3 | 1.7 | 2.3 | 1005 | 31.6 | 31758 | 36 | Poor | Comparative Example |
| 16Ht | 1.1 | 1.6 | 0.9 | 3.4 | 1252 | 26.5 | 33178 | 32 | Good | Example |
| 17Ht | 1.1 | 1.4 | 0.8 | 3.6 | 1266 | 26.0 | 32916 | 35 | Good | Example |
| 18Ht | 0.9 | 1.2 | 1.0 | 3.1 | 1220 | 28.4 | 34648 | 31 | Poor | Comparative Example |
| 19Ht | 1.7 | 1.7 | 0.9 | 3.3 | 1257 | 26.0 | 32682 | 36 | Poor | Comparative Example |
| 20Ht | 1.8 | 1.4 | 0.3 | 3.0 | 956 | 22.3 | 21319 | 17 | Good | Comparative Example |
| 21Ht | 1.9 | 2.1 | 0.7 | 2.1 | 1388 | 19.3 | 26788 | 8 | Poor | Comparative Example |
| 22Ht | 1.4 | 1.8 | 1.2 | 3.1 | 1205 | 27.3 | 32897 | 32 | Good | Example |
| 23Ht | 1.4 | 1.6 | 1.0 | 3.4 | 1102 | 31.5 | 34713 | 40 | Good | Example |
| 24Ht | 1.9 | 1.8 | 1.1 | 3.2 | 1100 | 28.4 | 31240 | 34 | Good | Example |
| 25Ht | 1.2 | 1.3 | 0.8 | 2.6 | 982 | 33.5 | 32897 | 45 | Good | Example |
| 26Ht | 1.6 | 1.4 | 1.1 | 3.1 | 1067 | 30.6 | 32650 | 33 | Good | Example |
| 27Ht | 1.4 | 1.3 | 1.1 | 3.0 | 1012 | 32.1 | 32485 | 36 | Poor | Comparative Example |
| 28Ht | 1.5 | 2.0 | 1.6 | 2.8 | 1189 | 26.9 | 31984 | 30 | Poor | Comparative Example |
| 29Ht | 3.3 | 1.4 | 1.4 | 3.6 | 1060 | 28.9 | 30634 | 36 | Poor | Comparative Example |
| 30Ht | 3.5 | 4.9 | 0.3 | 1.7 | 976 | 24.6 | 24010 | 27 | Poor | Comparative Example |
| 31Ht | 1.2 | 4.5 | 2.1 | 5.2 | 1337 | 27.0 | 36099 | 5 | Poor | Comparative Example |
| 32Ht | 1.3 | 3.1 | 1.8 | 1.8 | 1145 | 30.3 | 34694 | 32 | Good | Example |
| 33Ht | 3.0 | 6.1 | 0.3 | 1.5 | 977 | 22.3 | 21787 | 51 | Poor | Comparative Example |
| 34Ht | 3.1 | 4.3 | 0.8 | 1.5 | 913 | 24.5 | 22369 | 49 | Poor | Comparative Example |
| 35Ht | 1.0 | 2.0 | 1.1 | 3.3 | 1188 | 28.6 | 33977 | 51 | Good | Example |
| 36Ht | 1.2 | 1.6 | 1.2 | 2.8 | 1169 | 27.0 | 31563 | 8 | Poor | Comparative Example |

TABLE 5

| Cold rolled sheet ID | Hot-rolled and heat-treated material ID | As hot rolled material ID | Steel ID | Cold rolling Rolling reduction (%) | Primary annealing temperature (° C.) | Primary annealing time (s) | Secondary annealing temperature (° C.) | Secondary annealing time (s) | Coating alloying temperature (° C.) | Secondary phase volume fraction (%) | Retained γ volume fraction (%) | M volume fraction (%) |
|---|---|---|---|---|---|---|---|---|---|---|---|---|
| 1C | 1Ht | 1H | A | 40 | 650 | 200 | — | — | 500 | 35.7 | 19.6 | 15.5 |
| 2C | 2Ht | 2H | A | 40 | 650 | 200 | — | — | 500 | 33.9 | 20.5 | 13.3 |
| 3C | 2Ht | 2H | A | 40 | 650 | 120 | 650 | 3600 | — | 33.8 | 22.8 | 11.0 |
| 4C | 2Ht | 2H | A | 40 | 650 | 3600 | 650 | 150 | 500 | 34.0 | 23.5 | 10.5 |
| 5C | 2Ht | 2H | A | 40 | 720 | 150 | — | — | — | 68.7 | 28.8 | 34.2 |
| 6C | 2Ht | 2H | A | 40 | 650 | 15 | — | — | 500 | 27.8 | 9.4 | 13.0 |
| 7C | 2Ht | 2H | A | — | 650 | 200 | — | — | 500 | 38.6 | 26.4 | 12.2 |

TABLE 5-continued

| | | | | | | | | | | | | |
|---|---|---|---|---|---|---|---|---|---|---|---|---|
| 8C | 3Ht | 6H | A | 40 | 650 | 200 | — | — | 500 | 35.0 | 21.5 | 13.4 |
| 9C | 4Ht | 7H | A | 30 | 650 | 30 | — | — | — | 35.8 | 20.1 | 15.7 |
| 10C | 5Ht | 8H | A | 40 | 650 | 200 | — | — | 500 | 36.8 | 20.4 | 16.3 |
| 11C | 6Ht | 9H | A | 30 | 660 | 120 | — | — | 500 | 34.0 | 20.9 | 13.1 |
| 12C | 7Ht | 10H | A | 40 | 640 | 120 | — | — | 500 | 31.1 | 18.7 | 12.4 |
| 13C | 8Ht | 3H | A | 40 | 650 | 200 | — | — | 500 | 55.2 | 11.1 | 42.2 |
| 14C | 9Ht | 4H | A | 40 | 650 | 200 | — | — | — | 96.7 | 8.7 | 80.6 |
| 15C | 10Ht | 5H | A | 30 | 650 | 200 | — | — | — | 33.2 | 23.0 | 10.2 |
| 16C | 11Ht | 2H | A | 40 | 650 | 200 | — | — | 500 | 97.0 | 9.5 | 80.8 |
| 17C | 12Ht | 2H | A | 40 | 650 | 200 | — | — | — | 44.0 | 12.2 | 26.3 |
| 18C | 13Ht | 2H | A | 30 | 640 | 60 | — | — | 500 | 30.5 | 18.6 | 11.9 |
| 19C | 14Ht | 2H | A | 5 | 650 | 120 | — | — | 500 | 40.2 | 22.4 | 17.8 |
| 20C | 2Ht | 2H | A | 40 | 450 | 200 | — | — | — | 8.6 | 3.3 | 4.4 |
| 21C | 15Ht | 11H | B | 40 | 650 | 200 | — | — | — | 39.0 | 23.5 | 15.5 |
| 22C | 16Ht | 12H | C | 40 | 585 | 200 | — | — | — | 60.2 | 33.6 | 26.6 |
| 23C | 16Ht | 12H | C | 10 | 585 | 200 | — | — | — | 55.0 | 26.8 | 28.2 |
| 24C | 17Ht | 13H | C | 30 | 600 | 120 | — | — | 500 | 54.6 | 34.6 | 20.0 |
| 25C | 18Ht | 14H | C | 30 | 580 | 120 | — | — | — | 55.6 | 32.3 | 23.3 |
| 26C | 19Ht | 15H | C | 30 | 600 | 120 | — | — | 500 | 52.3 | 31.4 | 20.9 |
| 27C | 20Ht | 16H | D | 40 | 770 | 200 | — | — | — | 21.3 | 3.1 | 15.6 |
| 28C | 21Ht | 17H | E | 40 | 750 | 200 | — | — | — | 62.0 | 37.2 | 24.5 |
| 29C | 22Ht | 18H | F | 40 | 630 | 200 | — | — | — | 41.6 | 26.1 | 15.5 |
| 30C | 23Ht | 19H | F | 30 | 600 | 120 | — | — | 500 | 39.3 | 25.5 | 13.8 |
| 31C | 24Ht | 20H | G | 40 | 680 | 200 | — | — | 500 | 48.0 | 19.8 | 26.1 |
| 32C | 25Ht | 21H | G | 30 | 660 | 60 | — | — | — | 43.2 | 20.3 | 20.8 |
| 33C | 26Ht | 22H | H | 40 | 630 | 200 | — | — | — | 27.8 | 16.7 | 11.1 |
| 34C | 27Ht | 23H | I | 40 | 640 | 200 | — | — | — | 34.8 | 21.7 | 13.1 |
| 35C | 28Ht | 24H | J | 40 | 640 | 200 | — | — | — | 41.8 | 26.3 | 15.5 |
| 36C | 29Ht | 25H | K | 40 | 640 | 200 | — | — | 500 | 37.7 | 23.0 | 14.7 |
| 37C | 30Ht | 26H | L | 40 | 680 | 200 | — | — | — | 49.2 | 2.3 | 30.3 |
| 38C | 31Ht | 27H | M | 40 | 450 | 200 | — | — | — | 98.1 | 66.2 | 31.9 |
| 39C | 32Ht | 28H | N | 40 | 520 | 200 | — | — | — | 73.8 | 20.6 | 38.9 |
| 40C | 33Ht | 29H | O | 40 | 720 | 200 | — | — | 500 | 49.2 | 5.6 | 23.3 |
| 41C | 34Ht | 30H | P | 40 | 630 | 120 | — | — | — | 23.0 | 10.3 | 10.6 |
| 42C | 35Ht | 31H | Q | 40 | 600 | 120 | — | — | — | 55.5 | 36.6 | 18.9 |
| 43C | 36Ht | 32H | R | 40 | 650 | 120 | — | — | — | 57.0 | 32.1 | 24.9 |

| | Cold-rolled and annealed sheet microstructure | | | | Mechanical properties | | | | | |
|---|---|---|---|---|---|---|---|---|---|---|
| Cold rolled sheet ID | B volume fraction (%) | Retained γ average grain size (μm) | Retained γ average aspect ratio | Retained γ/F grain number ratio | Ratio γMn/αMn | Tensile strength TS (MPa) | Total elongation El (%) | TS × El (MPa %) | λ (%) | Surface appearance | Remarks |
| 1C | 0.6 | 1.0 | 1.5 | 0.8 | 2.2 | 1088 | 26.1 | 28397 | 18 | Poor | Comparative Example |
| 2C | 0.1 | 0.7 | 1.4 | 0.9 | 3.0 | 1220 | 27.8 | 33916 | 43 | Good | Example |
| 3C | 0.0 | 1.3 | 1.3 | 1.1 | 3.7 | 983 | 34.1 | 33282 | 43 | Good | Example |
| 4C | 0.0 | 1.3 | 1.2 | 1.1 | 3.7 | 986 | 33.4 | 32932 | 45 | Good | Example |
| 5C | 5.7 | 0.8 | 1.7 | 1.3 | 2.6 | 1235 | 21.7 | 26800 | 16 | Good | Comparative Example |
| 6C | 5.4 | 0.8 | 2.5 | 0.8 | 2.1 | 923 | 25.3 | 23352 | 20 | Good | Comparative Example |
| 7C | 0.0 | 1.4 | 2.7 | 1.0 | 3.3 | 983 | 33.8 | 33225 | 40 | Good | Example |
| 8C | 0.1 | 0.7 | 1.4 | 0.9 | 2.8 | 1201 | 27.0 | 32427 | 45 | Poor | Comparative Example |
| 9C | 0.0 | 1.0 | 1.2 | 0.9 | 3.3 | 1236 | 27.3 | 33743 | 43 | Poor | Comparative Example |
| 10C | 0.1 | 0.6 | 1.3 | 0.8 | 2.5 | 1186 | 24.3 | 28820 | 28 | Poor | Comparative Example |
| 11C | 0.0 | 0.8 | 1.2 | 0.9 | 3.4 | 1235 | 27.4 | 33839 | 42 | Good | Example |
| 12C | 0.0 | 0.8 | 1.2 | 0.8 | 3.5 | 1210 | 27.7 | 33517 | 43 | Good | Example |
| 13C | 1.9 | 1.3 | 5.1 | 0.2 | 1.2 | 956 | 23.3 | 22275 | 48 | Poor | Comparative Example |
| 14C | 7.4 | 3.1 | 7.1 | 0.2 | 1.2 | 858 | 24.5 | 21021 | 64 | Poor | Comparative Example |
| 15C | 0.0 | 1.2 | 1.5 | 1.1 | 3.0 | 1207 | 28.1 | 33917 | 43 | Poor | Comparative Example |
| 16C | 6.7 | 1.2 | 7.7 | 0.2 | 1.3 | 935 | 23.2 | 21692 | 55 | Good | Comparative Example |
| 17C | 5.5 | 1.2 | 6.4 | 0.2 | 1.2 | 1132 | 16.4 | 18565 | 56 | Good | Comparative Example |
| 18C | 0.0 | 0.9 | 1.3 | 0.7 | 3.6 | 1200 | 28.8 | 34560 | 45 | Good | Example |
| 19C | 4.2 | 1.4 | 1.6 | 0.3 | 2.4 | 1297 | 18.8 | 24384 | 21 | Poor | Comparative Example |
| 20C | 0.9 | 0.8 | 6.9 | 0.1 | 1.3 | 780 | 19.6 | 15288 | 45 | Good | Comparative Example |
| 21C | 0.0 | 2.2 | 1.3 | 0.9 | 2.2 | 1018 | 28.3 | 28809 | 23 | Poor | Comparative Example |
| 22C | 0.0 | 0.5 | 1.2 | 0.7 | 3.3 | 1322 | 25.3 | 33447 | 41 | Good | Example |
| 23C | 0.0 | 0.5 | 1.0 | 0.4 | 3.1 | 1416 | 14.4 | 20390 | 10 | Good | Comparative Example |
| 24C | 0.0 | 0.6 | 1.2 | 0.7 | 3.4 | 1288 | 26.5 | 34132 | 41 | Good | Example |
| 25C | 0.0 | 0.6 | 1.3 | 0.9 | 3.1 | 1279 | 27.0 | 34533 | 38 | Poor | Comparative Example |
| 26C | 0.0 | 0.7 | 1.2 | 0.7 | 3.2 | 1270 | 26.2 | 33274 | 40 | Poor | Comparative Example |
| 27C | 2.6 | 0.5 | 1.3 | 0.1 | 2.0 | 688 | 25.3 | 17406 | 59 | Good | Comparative Example |
| 28C | 0.3 | 1.3 | 1.7 | 0.7 | 2.7 | 1398 | 18.3 | 25583 | 33 | Poor | Comparative Example |
| 29C | 0.0 | 0.5 | 1.3 | 1.2 | 2.3 | 1299 | 25.5 | 33125 | 43 | Good | Example |
| 30C | 0.0 | 0.6 | 1.2 | 0.8 | 3.2 | 1274 | 26.6 | 33888 | 48 | Good | Example |
| 31C | 2.1 | 0.9 | 1.8 | 0.7 | 1.8 | 1200 | 29.0 | 34800 | 40 | Good | Example |
| 32C | 2.1 | 0.9 | 1.6 | 0.8 | 1.9 | 1156 | 29.2 | 33755 | 43 | Good | Example |
| 33C | 0.0 | 0.7 | 1.3 | 0.9 | 3.0 | 1194 | 28.5 | 34029 | 48 | Good | Example |
| 34C | 0.0 | 2.3 | 1.4 | 1.1 | 3.1 | 1066 | 29.8 | 31767 | 44 | Poor | Comparative Example |
| 35C | 0.0 | 1.8 | 1.3 | 1.1 | 2.9 | 1361 | 23.1 | 31439 | 34 | Poor | Comparative Example |
| 36C | 0.0 | 0.7 | 1.3 | 1.4 | 2.6 | 1345 | 25.6 | 34432 | 56 | Poor | Comparative Example |

TABLE 5-continued

| | | | | | | | | | | |
|---|---|---|---|---|---|---|---|---|---|---|
| 37C | 16.6 | 0.3 | 6.4 | 0.3 | 1.5 | 841 | 22.1 | 18586 | 50 | Poor | Comparative Example |
| 38C | 0.0 | 2.5 | 4.5 | 2.6 | 1.1 | 1155 | 33.1 | 38231 | 11 | Poor | Comparative Example |
| 39C | 14.3 | 0.5 | 1.2 | 1.0 | 1.8 | 1256 | 27.8 | 34917 | 43 | Good | Example |
| 40C | 20.3 | 2.5 | 6.0 | 0.4 | 1.5 | 970 | 21.0 | 20370 | 40 | Poor | Comparative Example |
| 41C | 2.1 | 1.0 | 2.2 | 0.6 | 1.6 | 922 | 25.1 | 23142 | 55 | Poor | Comparative Example |
| 42C | 0.0 | 0.6 | 1.3 | 0.9 | 3.5 | 1191 | 27.8 | 33110 | 56 | Good | Example |
| 43C | 0.0 | 0.6 | 1.4 | 0.8 | 3.4 | 1154 | 28.0 | 32312 | 12 | Poor | Comparative Example |

ΔMn in the material (slab) or the hot rolled material (hot rolled sheet) was calculated as follows. EPMA linear analysis (beam diameter 1 μm) for any 10 mm in the sheet transverse direction at a depth position of ¼ of the sheet thickness t from the slab surface or the hot rolled sheet surface was performed at a plurality of locations, and the moving average of N=5 was taken to obtain a profile of Mn concentration. After this, the maximum and minimum concentrations of the adjacent negative segregation area (dendrite stem) of Mn and positive segregation area (interdendrite) of Mn were measured, and the average of the concentration differences of 150 or more positive and negative segregation pairs was set as ΔMn.

Moreover, the following samples were collected from the hot rolled sheet and the cold rolled sheet as appropriate, and the microstructure, the mechanical properties, and the surface quality were evaluated.

Regarding the microstructure, a billet in an L section (plane parallel to the rolling direction and perpendicular to the transverse direction) was collected in each stage of the slab, the hot rolled sheet, and the cold rolled sheet (steel strip). After mirror polishing, microstructure was exposed by etching using a 3% nitric acid ethanol solution. This was photographed at a position of ¼ of the sheet thickness randomly for 10 observation fields at 5,000 magnifications, using a scanning electron microscope.

In the micrograph, black contrast regions were regarded as ferrite, gray contrast regions as retained austenite and martensite, and fine (0.1 μm or less) white dots as cementite. Moreover, regions in which cementite is in a dot sequence shape to form layered morphology with linear (acicular) ferrite were regarded as bainite, and mixed microstructure of fine cementite not in a dot sequence shape and fine ferrite as tempered martensite. The ratio of the area of each phase to the whole observation area was calculated as the volume fraction of the phase.

The volume fraction of retained austenite was calculated as follows. For the sample (billet) in each stage mentioned above, on an exposed surface of a depth portion of ¼ of the sheet thickness from the billet surface resulting from grinding and chemical polishing, an X-ray diffractometer (RINT2200 by Rigaku Corporation) was used to measure the integrated intensity of X-ray diffraction line for the iron ferrite planes of {200}, {211}, and {220} and the austenite planes of {200}, {220}, and {311}, with Mo-Kα radiation as a radiation source and an acceleration voltage of 50 keV. Using the measured values, the volume fraction of retained austenite was calculated according to numerical formulae described in a document (Rigaku Corporation: "X-ray Diffraction Handbook (2000), no. 26, pp. 62-64). The volume fraction of martensite was obtained by subtracting the volume fraction of retained austenite measured by X-ray diffraction from the total volume fraction of martensite and retained austenite measured from the micrograph.

The mechanical properties were evaluated as follows. A JIS No. 5 tensile test piece whose longitudinal direction is the sheet transverse direction was collected from the cold rolled sheet (steel strip), and a tensile test conforming to JIS Z2241 (1998) was conducted to measure various mechanical properties (tensile strength (TS), total elongation (El)). In the disclosure, a TS of 980 MPa or more and an El of 30.6% or more, i.e. a TS-El balance of 30000 MPa % or more, was evaluated as good.

The stretch flangeability was evaluated by a hole expanding test conforming to the Japan Iron and Steel Federation Standard JFST 1001 (2008). A test piece of 100 mm×100 mm per side was collected from the annealed sheet after the cold rolling, and a hole was punched using a punching tool with a clearance of 12.5%. After this, a conical punch with a vertex angle of 60 degrees was used to expand the hole so that the burrs formed upon the punching faced outward. From $d_0$: the initial hole diameter (mm) and d: the hole diameter upon cracking (mm) when the crack extended through the sheet in the thickness direction, hole expansion ratio $\lambda$ (%)={$(d-d_0)/d_0$}×100 was calculated. In the disclosure, $\lambda$ of 40% or more was evaluated as good.

The hot ductility was evaluated as follows. A round bar tensile test piece having a parallel portion length of 15 mm, a shoulder R of 5 mm, and a parallel portion diameter of 6 mmφ was collected from the slab, and the parallel portion was subjected to heating of 1300° C.×300 s by Thermec-Master (by Fuji Electronic Industrial Corporation) and then cooled to 700° C., 750° C., and 800° C. at −5° C./s. Following this, the test piece was subjected to tensile working at a strain rate of 0.002 (1/s) isothermally. From D0: the initial diameter of the parallel portion upon fracture (mm) and D: the diameter of the fractured portion tip after fracture (mm), hot reduction of area RA (%)={$(D-D_0)/D_0$}×100 was calculated and averaged. In the disclosure, a RA of 50% or more was evaluated as good. The evaluation results are listed in Table 2.

The surface quality of the slab was evaluated as follows. The whole slab was examined for 100 m or more in total, and the case of having no cracking was evaluated as 1, the case of having slight cracking that can be eliminated by scale off in a heating furnace as 2, the case of having slab cracking that requires mending as 3, and the case of having cracking that cannot be removed by mending and requires cutting the slab for removal or disposing of the slab as 4. 2 or less was evaluated as good, and 3 or more as poor. The evaluation results are listed in Table 2.

The surface quality of the hot rolled sheet was evaluated as follows. The hot rolled sheet (steel strip) was examined across the total length for 200 m or more on both the front and back sides. The case where a linear pattern of scale or steel substrate overlap caused by slab cracking during casting or hot rolling is 1 m or more was evaluated as "poor", and the case where such a linear pattern is less than 1 m as "good".

The surface quality of the cold rolled sheet was evaluated as follows. The cold rolled sheet (steel strip) was examined across the total length for 1000 m or more on both the front and back sides. The case where a linear pattern of scale or steel substrate overlap caused by slab cracking during casting or hot rolling is 1 m or more was evaluated as "poor", and the case where such a linear pattern is less than 1 m as "good". Regarding the coated or plated steel sheet, the case of having a non-coating area or a non-plating area was also evaluated as "poor".

The evaluation results are listed in Table 5.

All high strength steel sheets of Examples satisfying the range of the composition and the range of the manufacturing conditions according to the disclosure had high strength with a TS of 980 MPa or more, and also had both high ductility with a TS-El balance of 30000 MPa % or more and high stretch flangeability with λ of 30% or more. Moreover, degradation in surface quality caused by slab cracking and embrittlement cracking upon hot rolling was completely suppressed.

The invention claimed is:

1. A hot-rolled and annealed material for high strength steel sheets having a tensile strength of 980 MPa or more, comprising:
   a chemical composition containing, in mass %,
   C: 0.08% or more and 0.30% or less,
   Si: 0.48% or less,
   Mn: more than 3.0% and 10.0% or less,
   P: 0.05% or less,
   S: 0.01% or less,
   Al: 1.5% or less,
   Ti: 0.010% or more and 0.300% or less, and
   N: 0.0020% or more and 0.0100% or less
   in a range satisfying the following Expression (1), with a balance being Fe and incidental impurities, $$1.1 \le ([Ti]+[Mn]^{1/2}/400)/(0.01+5[N]) \le 6.0 \quad (1)$$

where [Ti], [Mn], and [N] respectively denote contents of elements Ti, Mn, and N in mass %; and
   a microstructure including a retained austenite phase and a ferrite phase,
   wherein a ratio γMn/αMn of an average Mn concentration γMn of the retained austenite phase to an average Mn concentration αMn of the ferrite phase is 1.5 or more.

2. The hot-rolled and annealed material for high strength steel sheets according to claim 1,
   wherein the chemical composition further contains, in mass %, one or more selected from the group consisting of:
   Cr: 1.0% or less,
   Ni: 1.0% or less,
   Mo: 1.0% or less,
   Cu: 1.0% or less,
   Nb: 0.1% or less,
   V: 0.1% or less,
   B: 0.0050% or less,
   Ca: 1.0% or less,
   REM: 1.0% or less,
   Sn: 0.20% or less, and
   Sb: 0.2% or less.

3. A method of manufacturing the hot-rolled and annealed material for high strength steel sheets of claim 1, comprising:
   continuous casting molten steel having the chemical composition according to claim 1 to obtain a slab, the continuous casting including performing cooling with a specific water content S of 0.5 L/kg steel or more and 2.5 L/kg steel or less until a solidified shell surface layer portion temperature in the continuous casting reaches 900° C., passing the steel through a bending part and a straightening part at a temperature of 600° C. or more and 1150° C. or less, and then performing cooling with an average cooling rate from 400° C. to 200° C. being 1.0° C./s or less;
   hot rolling the obtained slab at a finisher delivery temperature of an Ar₃ point or more;
   thereafter performing coiling in a temperature range of [an Ms point+50° C.] or more and 700° C. or less, and performing cooling to 200° C. or less, to obtain a steel strip;
   further holding the obtained steel strip in a temperature range of [an Ac₁ transformation point−200° C.] or more and [the Ac₁ transformation point+100° C.] or less, for 30 min or more; and
   thereafter cooling the steel strip to 200° C. or less,
   thereby producing the hot-rolled and annealed material for high strength steel sheets of claim 1.

4. A method of manufacturing the hot-rolled and annealed material for high strength steel sheets of claim 2, comprising:
   continuous casting molten steel having the chemical composition according to claim 2 to obtain a slab, the continuous casting including performing cooling with a specific water content S of 0.5 L/kg steel or more and 2.5 L/kg steel or less until a solidified shell surface layer portion temperature in the continuous casting reaches 900° C., passing the steel through a bending part and a straightening part at a temperature of 600° C. or more and 1150° C. or less, and then performing cooling with an average cooling rate from 400° C. to 200° C. being 1.0° C./s or less;
   hot rolling the obtained slab at a finisher delivery temperature of an Ar₃ point or more;
   thereafter performing coiling in a temperature range of [an Ms point+50° C.] or more and 700° C. or less, and performing cooling to 200° C. or less, to obtain a steel strip;
   further holding the obtained steel strip in a temperature range of [an Ac₁ transformation point−200° C.] or more and [the Ac₁ transformation point+100° C.] or less, for 30 min or more; and
   thereafter cooling the steel strip to 200° C. or less,
   thereby producing the hot-rolled and annealed material for high strength steel sheets of claim 2.

5. A high strength steel sheet having a tensile strength of 980 MPa or more comprising:
   a chemical composition containing, in mass %,
   C: 0.08% or more and 0.30% or less,
   Si: 2.0%0.48% or less,
   Mn: more than 3.0% and 10.0% or less,
   P: 0.05% or less,
   S: 0.01% or less,
   Al: 1.5% or less,
   Ti: 0.010% or more and 0.300% or less, and
   N: 0.0020% or more and 0.0100% or less
   in a range satisfying the following Expression (1), with a balance being Fe and incidental impurities, $$1.1 \le ([Ti]+[Mn]^{1/2}/400)/(0.01+5[N]) \le 6.0 \quad (1)$$

where [Ti], [Mn], and [N] respectively denote contents of elements Ti, Mn, and N in mass %; and
   a microstructure including a retained austenite phase and a ferrite phase,
   wherein a ratio γMn/αMn of an average Mn concentration γMn of the retained austenite phase to an average Mn concentration αMn of the ferrite phase is 1.5 or more.

6. The high strength steel sheet according to claim 5, wherein the chemical composition further contains, in mass %, one or more selected from the group consisting of:
Cr: 1.0% or less,
Ni: 1.0% or less,
Mo: 1.0% or less,
Cu: 1.0% or less,
Nb: 0.1% or less,
V: 0.1% or less,
B: 0.0050% or less,
Ca: 1.0% or less,
REM: 1.0% or less,
Sn: 0.20% or less, and
Sb: 0.2% or less.

7. A method of manufacturing the high strength steel sheet of claim 5, comprising:
continuous casting molten steel having the chemical composition according to claim 5 to obtain a slab, the continuous casting including performing cooling with a specific water content S of 0.5 L/kg steel or more and 2.5 L/kg steel or less until a solidified shell surface layer portion temperature in a secondary cooling zone reaches 900° C., passing the steel through a bending part and a straightening part at a temperature of 600° C. or more and 1150° C. or less, and then performing cooling with an average cooling rate from 400° C. to 200° C. being 1.0° C./s or less;
hot rolling the obtained slab at a finisher delivery temperature of an $Ar_3$ point or more, to obtain a hot rolled steel sheet;
thereafter coiling the hot rolled steel sheet in a temperature range of [an Ms point+50° C.] or more and 700° C. or less, and cooling the hot rolled steel sheet to 200° C. or less;
thereafter cold rolling or warm rolling the hot rolled steel sheet at a rolling reduction of 15% or more; and
thereafter holding the steel sheet in a temperature range of an $Ac_1$ transformation point or more and [the $Ac_1$ transformation point+(the $Ac_3$ transformation point−the $Ac_1$ transformation point)/2] or less, for 30 sec or more and 400 min or less,
thereby producing the high strength steel sheet of claim 5.

8. A method of manufacturing the high strength steel sheet of claim 6, comprising:
continuous casting molten steel having the chemical composition according to claim 6 to obtain a slab, the continuous casting including performing cooling with a specific water content S of 0.5 L/kg steel or more and 2.5 L/kg steel or less until a solidified shell surface layer portion temperature in a secondary cooling zone reaches 900° C., passing the steel through a bending part and a straightening part at a temperature of 600° C. or more and 1150° C. or less, and then performing cooling with an average cooling rate from 400° C. to 200° C. being 1.0° C./s or less;
hot rolling the obtained slab at a finisher delivery temperature of an $Ar_3$ point or more, to obtain a hot rolled steel sheet;
thereafter coiling the hot rolled steel sheet in a temperature range of [an Ms point+50° C.] or more and 700° C. or less, and cooling the hot rolled steel sheet to 200° C. or less;
thereafter cold rolling or warm rolling the hot rolled steel sheet at a rolling reduction of 15% or more; and
thereafter holding the steel sheet in a temperature range of an $Ac_1$ transformation point or more and [the $Ac_1$ transformation point+(the $Ac_3$ transformation point−the $Ac_1$ transformation point)/2] or less, for 30 sec or more and 400 min or less,
thereby producing the high strength steel sheet of claim 6.

9. A method of manufacturing the high strength steel sheet of claim 5, comprising:
continuous casting molten steel having the chemical composition according to claim 5 to obtain a slab, the continuous casting including performing cooling with a specific water content S of 0.5 L/kg steel or more and 2.5 L/kg steel or less until a solidified shell surface layer portion temperature in a secondary cooling zone reaches 900° C., passing the steel through a bending part and a straightening part at a temperature of 600° C. or more and 1150° C. or less, and then performing cooling with an average cooling rate from 400° C. to 200° C. being 1.0° C./s or less;
hot rolling the obtained slab at a finisher delivery temperature of an $Ar_3$ point or more, to obtain a hot rolled steel sheet;
thereafter coiling the hot rolled steel sheet in a temperature range of [an Ms point+50° C.] or more and 700° C. or less, and cooling the hot rolled steel sheet to 200° C. or less, to obtain a steel strip;
further holding the obtained steel strip in a temperature range of [an $Ac_1$ transformation point−200° C.] or more and [the $Ac_1$ transformation point+100° C.] or less, for 30 min or more;
thereafter cooling the steel strip to 200° C. or less;
thereafter cold rolling or warm rolling the steel strip at a rolling reduction of 15% or more; and
thereafter holding the steel strip in a temperature range of the $Ac_1$ transformation point or more and [the $Ac_1$ transformation point+(the $Ac_3$ transformation point−the $Ac_1$ transformation point)/2] or less, for 30 sec or more and 400 min or less,
thereby producing the high strength steel sheet of claim 5.

10. A method of manufacturing the high strength steel sheet of claim 6, comprising:
continuous casting molten steel having the chemical composition according to claim 6 to obtain a slab, the continuous casting including performing cooling with a specific water content S of 0.5 L/kg steel or more and 2.5 L/kg steel or less until a solidified shell surface layer portion temperature in a secondary cooling zone reaches 900° C., passing the steel through a bending part and a straightening part at a temperature of 600° C. or more and 1150° C. or less, and then performing cooling with an average cooling rate from 400° C. to 200° C. being 1.0° C./s or less;
hot rolling the obtained slab at a finisher delivery temperature of an $Ar_3$ point or more, to obtain a hot rolled steel sheet;
thereafter coiling the hot rolled steel sheet in a temperature range of [an Ms point+50° C.] or more and 700° C. or less, and cooling the hot rolled steel sheet to 200° C. or less, to obtain a steel strip;
further holding the obtained steel strip in a temperature range of [an $Ac_1$ transformation point−200° C.] or more and [the $Ac_1$ transformation point+100° C.] or less, for 30 min or more;
thereafter cooling the steel strip to 200° C. or less;
thereafter cold rolling or warm rolling the steel strip at a rolling reduction of 15% or more; and
thereafter holding the steel strip in a temperature range of the $Ac_1$ transformation point or more and [the $Ac_1$ transformation point+(the $Ac_3$ transformation point−the $Ac_1$ transformation point)/2] or less, for 30 sec or more and 400 min or less, thereby producing the high strength steel sheet of claim 6.

11. A high strength hot-dip-coated steel sheet comprising:

the high strength steel sheet according to claim 5; and a hot-dip galvanized coating or a hot-dip aluminum coating on a surface of the high strength steel sheet.

12. A high strength hot-dip-coated steel sheet comprising:

the high strength steel sheet according to claim 6; and a hot-dip galvanized coating or a hot-dip aluminum coating on a surface of the high strength steel sheet.

13. A high strength electroplated steel sheet comprising:

the high strength hot-dip-coated steel sheet according to claim 11; and an electroplating on a surface of the high strength hot-dip-coated steel sheet.

14. A high strength electroplated steel sheet comprising:

the high strength hot-dip-coated steel sheet according to claim 12; and an electroplating on a surface of the high strength hot-dip-coated steel sheet.

\* \* \* \* \*